United States Patent [19]
Adachi et al.

[11] Patent Number: 5,682,070
[45] Date of Patent: Oct. 28, 1997

[54] VEHICLE-MOUNTED ALTERNATOR

[75] Inventors: Katsumi Adachi; Kazunori Tanaka; Kyoko Kurusu, all of Himeji, Japan

[73] Assignee: Mitsubishi Denki Kabushiki Kaisha, Tokyo, Japan

[21] Appl. No.: 572,672

[22] Filed: Dec. 14, 1995

[30] Foreign Application Priority Data

Jun. 28, 1995 [JP] Japan .................... 7-162291

[51] Int. Cl.⁶ ................................ H02K 9/02
[52] U.S. Cl. ............... 310/71; 310/68 D; 310/68 R; 363/142; 363/146
[58] Field of Search ................ 310/68 R, 71, 310/68 D; 363/146, 142

[56] References Cited

U.S. PATENT DOCUMENTS

| | | | |
|---|---|---|---|
| 3,602,793 | 8/1971 | Grozinger | 310/68 R |
| 3,604,963 | 9/1971 | Tawara | 310/68 R |
| 3,970,881 | 7/1976 | Sato | 310/68 R |
| 4,419,597 | 12/1983 | Shiga et al. | 310/68 |
| 4,952,829 | 8/1990 | Armbruster et al. | 310/68 R |
| 5,229,675 | 7/1993 | Gotoh | 310/71 |
| 5,233,246 | 8/1993 | Yockey | 310/71 |
| 5,296,770 | 3/1994 | Pflueger et al. | 310/68 |
| 5,451,823 | 9/1995 | Deverhall et al. | 310/68 R |

*Primary Examiner*—Steven L. Stephan
*Assistant Examiner*—Tran N. Nguyen
*Attorney, Agent, or Firm*—Sughrue, Mion, Zinn, Macpeak & Seas, PLLC

[57] ABSTRACT

Phase coil lead wires of a vehicle-mounted alternator with two three-phase star connections are led almost in parallel out of the armature in an axial direction, welded to lead wire connection parts of insert terminals of a circuit board, and connected in parallel to form the star connections by way of the insert terminals. The star connections are achieved in a solderless manner, without twisting or bending the phase coil lead wires. Consequently, there is no possibility of injuring the lead wires due to applications of large stress.

15 Claims, 21 Drawing Sheets

PRIOR ART

PRIOR ART

PRIOR ART

PRIOR ART

PRIOR ART

VEHICLE-MOUNTED ALTERNATOR

FIELD OF THE INVENTION

This relates to a vehicle-mounted alternator and, more particularly, to improvements in the connection of a stator winding thereof.

DESCRIPTION OF THE RELATED ART

FIGS. 20 to 28 show a conventional vehicle-mounted alternator (hereinafter, "generator"), in which FIG. 20 is a sectional view of the generator, FIG. 21 is a circuit diagram of the generator, and FIG. 22 is a schematic diagram showing a winding an armature. FIG. 23 is an explanatory view showing an arrangement of lead wires of the armature winding, FIG. 24 is a perspective view of the armature, FIG. 25 is an explanatory view of an assembly of the armature, and FIG. 26 is a plan view showing a cooling plate part of a rectifier.

In the drawings, reference numeral 1 denotes a front bracket, 2 denotes a rear bracket, and 3 denotes a rotor. The rotor 3 has a rotary shaft 31, field cores 32a, 32b, field winding 33, cooling fans 34a, 34b, and a current collector 35. The rotary shaft 31 is supported by the front bracket 1 and rear bracket 2 through bearings 4a, 4b. The field cores 32a, 32b are of Landor type in which the field winding 33 is incorporated, and the field winding 33 is connected to the current collector 35. The field cores 32a, 32b, and the current collector 35 are fixedly inserted on the rotary shaft 31 so as to rotate integrally with the rotary shaft 31. In addition, the cooling fans 34a, 34b are respectively fixed to the side of the field cores 32a, 32b.

Numeral 5 denotes an armature serving as a stator which has an armature core 51 serving as a stator core and an armature winding 52 serving as a stator winding. The armature winding 52 is inserted in a slot 51a (as shown in FIG. 22) of the armature core 51, and a coil end 52a is projected from the armature coil 51 in axial direction. The armature core 51 has an inner peripheral wall thereby forming a cylindrical hollow part, in which the rotor 3 is inserted.

As shown in FIG. 21, in this conventional generator, the armature winding 52 is formed of two pairs of three-phase coils 53, 54 each being formed into a three-phase star connection and connected in parallel, and a neutral point of each connection is led to outside (as described in detail later). In FIG. 20, numeral 6 denotes a voltage regulator, 8 is a rectifier, 9 is a partition plate, and 10 is a guide, which are all incorporated in the rear bracket 2. Numeral 11 is a through bolt by which the front bracket 1 and rear bracket 2 are secured to both sides of the armature core 51.

As shown in FIGS. 25 and 26, the rectifier 8 has cooling plates 81, 82, diodes 83, 84 and auxiliary terminal plate 86 with terminals 86a on a positive electrode (+) side and a negative electrode (−) side. The cooling plates 81, 82 have, respectively, concaves 81a, 82a concavely formed on the flat surface part and radiation fins 81b, 82b. Diodes 83, 84, are respectively soldered to the concaves 81a, 82a. As shown in FIG. 21, the diodes 83, 84 are respectively comprised of one diode element for each phase and neutral point, for a total of four diode elements each. The respective four diode elements are fixed to the cooling plates 81, 82 by direct soldering with their cathode or anode side connected in common. The other diode electrode is connected to leads 83a, 84a (see FIG. 26), and terminals 83b, 84b cut out in V-shape (see FIG. 25) are formed on the front ends of the leads. These terminals 83b, 84b are led to the position of terminals 86a of an auxiliary terminal plate 86 (described later) and soldered to the terminals 86a thereby forming an almost Y-shape.

As shown in FIG. 21, the auxiliary terminal plate 86 electrically connects the armature winding 52, voltage regulator 6 and diodes 83, 84, and has four terminals 86a and auxiliary terminals 86d, 86e. The auxiliary terminal plate 86 is prepared by the steps of forming a substrate 86b (see FIG. 25) of an insulating material integrally with a sheet of copper plate punched into a required shape, cutting off the unnecessary part of the copper plate, and erecting end portions to be linearly arranged thereby forming fixedly located terminals 86a. Terminals 83b, 84b of the diodes 83, 84 are connected to the terminals 86a, and three-phase lead wires 55 and junction lines 57 (later described), both from the armature 5, are also connected to respective terminals 86.

The left most one of the terminals 86a in FIG. 25, associated with the a-phase, extends downward and to the right in the drawing, and is provided with an auxiliary terminal 86d having a front end is erected by cutting. An a-phase voltage is supplied from this auxiliary terminal 86d to the voltage regulator 6 (see FIG. 21) as a voltage signal to control the voltage of the generator. Further, cooling plate 81, on the positive electrode side, is connected to another auxiliary terminal 86e having a front end erected by cutting, whereby an exciting current is supplied to field armature 33 (as seen in the circuit diagram of FIG. 21). In addition, paper boards 87 (see FIG. 25) are respectively put on the four terminals 86a to prevent the solder from dropping.

The cooling plates 81, 82, on which the diodes 83, 84 are fixedly soldered as mentioned above, are combined as shown in FIG. 26; on this assembly the auxiliary terminal plate 86, then the paper boards 87, then the partition plate 9, and then guides 10 are placed to reach a state of assembly as shown in FIG. 25. Then, this assembly is built in the rear bracket 2. Partition plate 9 is disposed, for the purpose of securing an opposed surface, between the blades of the cooling fan 34b. Guides 10 guide the later-described three-phase lead wires 55 and junction lines 57 to the terminals 86a of the auxiliary terminal plate 86 by their side surface portions 10a.

The armature 5 is excited by the rotating rotor 3, and generates a three-phase alternating current on the armature winding 52. Conventionally, armature winding 52 can be implemented by two pairs of three-phase windings 53, 54 in a three-phase star connection (as shown in the circuit diagram of FIG. 21), connected in parallel, each neutral point being led to outside. More specifically, this conventional armature winding 52 has a first three-phase winding 53 and a second three-phase winding 54, and the three-phase windings are respectively comprised of three-phase wave windings of a-phase, b-phase and c-phase. In this conventional example, the generator has twelve electrodes, the number of slots 51a of armature core 51 is thirty six, and the number of slots per electrode is three. The second three-phase winding 54 is wound on the slots 51a without concentration of windings, and with a dislocation of 30 degrees in physical angle (120 degrees in electrical angle) with respect to the first three-phase winding 53.

As shown in FIG. 23, each phase coil of the first three-phase winding 53 is led in axial direction of the armature core 51 so that lead wires 53as, 53bs, 53cs at the winding start and lead wires 53ae, 53be, 53ce at the winding end project out of the coil end 52a. Likewise in the second three-phase winding 54, lead wires 54as, 54bs, 54cs at the winding start and lead wires 54ae, 54be, 54ce at the winding end are also led out. As mentioned above, each phase coil of the first and second three-phase windings 53, 54 is incorporated in the slots 51a of the armature core 51 with a dislocation of 30 degrees.

As a result, either the lead wires 53as, 53bs, 53cs at the winding start of each phase coil of the first three-phase winding 53 and the lead wires 54ae, 54be, 54ce at the winding end of each phase coil of the second three-phase winding 54, or the lead wires 53ae, 53be, 53ce at the winding end of each phase coil of the first three-phase winding 53 and the lead wires 54as, 54bs, 54cs at the winding start of each phase coil of the second three phase winding 54, come to be located at the same slots. In this example (as seen in FIG. 22), the lead wires 53as, 53bs, 53cs at the winding start of each phase coil of the first three phase winding 53 are located at the same slots as those for the lead wires 54ae, 54be, 54ce at the winding end of each phase coil of the second three-phase winding 54. Accordingly, the twelve lead wires (of the six coils) are arranged to form nine groups in total.

Thus, when lead wires 53as, 53bs, 53cs at the winding start of each phase coil of the three-phase winding 53 and the lead wires 54ae, 54be, 54ce at the winding end of each phase coil of the second three-phase winding 54 are located in the same slots, the lead wires of each phase coil form nine groups, G1–G9, as follows: G1, 53ae; G2, 53be; G3, 54ae–53as; G4, 53ce; G5, 54be–53bs; G6, 54as; G7, 54ce–53cs; G8, 54bs; and G9, 54cs.

In this case, the three-phase connection lead wires 55 serving as lead wires on phase voltage side for connecting in three-phases connection are comprised of the three groups: G3, 54ae–53as; G5, 54be–53bs; G7, 54ce–53cs.

On the other hand, as to the connection of the neutral points 53n, 54n of each three-phase windings 53, 54 shown in FIG. 21, the lead wires in groups G1, G2, and G4 on the neutral point side of each phase coil, i.e., three lead wires 53ae, 53be, 53ce, and one end portion of the neutral lead 53nn are twisted together and electrically connected to each other by soldering or the like, thus forming neutral point 53n. Likewise, the lead wires in groups G6, G8, and G9, i.e., three lead wires 54as, 54bs, 54cs and one end portion of the neutral lead 54nn are twisted together and electrically connected to each other, by soldering or the like, to form neutral point 54n. Then, an insulating tube 56 is inserted in the neutral points 53n, 54n, and bending formation thereof is performed.

Further, the other ends of the neutral leads 53nn, 54nn are led to positions for easy connection to the rectifier 8, and led out in the axial direction of the armature 5 as junction lines 57. In this example, the lead-out positions of the junction lines 57 are positioned between the three-phase lead wires 55 as shown in FIG. 24. Furthermore, the neutral points 53n, 54n and the neutral leads 53nn, 54nn are fixed to the coil end 52a of the armature winding 52 by varnish (not shown) to avoid interfering with the rear bracket 2 and other elements.

The armature 5 and the rear bracket 2 are assembled in the following manner. As mentioned above, rectifier 8, partition plate 9, and guides 10 are preliminarily built in the rear bracket 2. As for the armature 5, the three-phase connection lead wires 55 of the armature winding 52 (the lead wires in groups G3, 54ae–53as; G5, 54be–53bs; G7, 54ce–53cs) and the junction lines 57 (53nn, 54nn) are preliminarily bent to extend along respective guides 10.

Then, armature 5 is assembled on the rear bracket 2. At this time, positions of the almost Y-shaped terminals 86a of the auxiliary terminal plate 86 are adjusted to meet the positions of the three-phase connection lead wires 55 and junction lines 57. After this assembly, the three-phase connection lead wires 55 and junction lines 57 are fitted to the respective terminals 86a of the auxiliary terminal plate 86, clamped, and soldered thereto to form an electrical connection. The works of fitting, clamping, and soldering are performed from inside of the armature core 51 (i.e., from the right-hand side in FIG. 20). Thereafter, rotor 3 is mounted on armature core 51.

In another example of a conventional armature, the neutral points are not led out from the armature (FIG. 27). Since the neutral points 53n, 54n are not led out, connection is required only for the neutral points 53n, 54n; the resulting arrangement is shown in perspective in FIG. 28. Therefore, when the armature 5 is assembled, the terminal 86a of the auxiliary terminal plate 86 corresponding to neutral leads 57 is freed. In FIG. 25, this is the second from the left terminal 86a.

Still another conventional armature includes only the first three-phase winding 53. Thus, the lead wires are six in number (i.e., lead wires 53ae, 53be, 53ce at the winding end of each phase coil and lead wires 53as, 53bs, 53cs at the winding start). Here, the lead wires 53ae, 53be, 53ce at the winding end are twisted together and electrically connected to form the neutral point 53n, and the lead wires 53as, 53bs, 53cs at the winding start form the three-phase connection lead lines 55.

Conventional generators of the construction shown in FIG. 20 have the following disadvantages with respect to the neutral points and leads:

a. Since the connection of the neutral points 53n, 54n is formed by twisting the lead wires, inserting the insulating tube 56, and bending them, the manufacturing process is complicated, and the coils might be sometimes injured, resulting in poor reliability.

b. In an armature provided with the neutral leads 53nn, 54nn, not only are the neutral leads required, but also it is necessary for those neutral leads 53nn, 54nn to be by-passed in view of their connecting position with rectifier 8. To meet such a difference in specification depending upon the existence or non-existence of the neutral leads 53nn, 54nn, it has been essential to change the manner of connecting the incorporating armature 5 in such a manner as shown in either FIG. 24 or FIG. 28. Furthermore, there is a difference in the aspect of connection manner itself between an armature having first three-phase winding 53 and second three-phase winding 54, and an armature having only first three-phase winding 53, thus complicating assembly.

To overcome these disadvantages, several attempts have been heretofore proposed, as described in Japanese patent publication (examined) SHO 45-32990. In this conventional generator, an electric conductor for connection of the neutral points, an electrical conductor for connection between diode terminals, and an electrical conductor for an auxiliary terminal are disposed on a circular arc strap-like substrate; the electrical conductors are connected to each other through short bars, and the short bars at necessary points are cut out according to the connection state of the rectifier. This arrangement makes it unnecessary to twist the three lead wires to form a neutral point, or to use a neutral lead. Further, only one type of circuit board is sufficient irrespective of the need for output from the neutral point.

However, further problems still exist in the conventional generator described in the mentioned Japanese patent publication (examined) SHO 45-32990 as follows:

a. The short bars to be cut must be changed according to the need for output from the neutral point, which requires a number of steps such as selection of cutting points, cutting the short bars, etc. This results in increased errors and is quite troublesome.

b. Moreover, since the holes into which the lead wires on the neutral point side of the armature coils are inserted, and the holes into which the lead wires on the phase voltage side are inserted are not provided on the same circular arc, the lead wires must be bent and inserted in their respective holes. Thus, in the same manner as in the conventional generator of FIG. 20, there are the disadvantages that the lead wires must be deformed at the time of assembling, or that a large stress is applied to the lead wires.

Additional disadvantages of conventional generators include:

a. Particularly, in the conventional generator shown in FIG. 20, the three-phase lead wires 55 and junction lines 57 of the armature winding 52 project from the axial end of the armature core 51, and form a circular arc (when viewed from the axial side). As a result, guides 10 are essential for connecting these lines with terminals 86a, arranged on the substrate 86b of the auxiliary terminal plate 86, and perpendicular to the axis of armature 5. Moreover, bending points are different, depending upon whether they were lead wires of group G3 (54ae-53as), G5 (54be-53bs), G7 (54ce-53cs) or junction lines 57. Consequently, the three-phase connection lead wires 55 and junction lines 57 can be deformed, or are subjected to a large stress. Moreover, and in the worst case, assembly itself is impossible on occurrence of any error in the bending position of the three-phase connection lead wires 55 or the junction lines 57.

d. The three-phase connection lead wires 55 and junction lines 57 must be soldered to the terminals 86a of the auxiliary terminal plate 86.

e. As shown in FIGS. 20 and 25, the three-phase connection lead wires 55 and junction lines 57 must be accommodated between partition plate 9 and fan 34b. Consequently, guides 10 must be employed. This causes the side facing fan 34b to be other than flat, resulting in poor fanning efficiency and high fanning noise.

SUMMARY OF THE INVENTION

The present invention was made to solve the above-mentioned problems and it is an object of the present invention to provide a vehicle-mounted alternator having the following advantages:

a. Arrangement of connection is simplified, and the connection is highly reliable.

b. Even if a plurality of coils are connected in parallel, the connection is easily achieved and highly reliable.

c. Only one type of junction connection device is sufficient, irrespective of the necessity of leading the neutral point to outside of the junction connection device, and therefore the junction connection device can be standardized.

d. The axial dimension of the vehicle-mounted alternator is prevented from being excessively elongated.

e. Heat radiation of the connecting conductor part in the junction connection device is satisfactory.

f. Connection in the junction connection device can be performed in a solderless manner.

g. Connection between the rectifier and the junction connection device is easy.

h. Fanning efficiency is improved, which results in improved cooling performance, and noise is reduced.

i. Errors in the leading position of the lead wires, expansion and shrinkage thereof due to vibration, temperature change, etc. can be absorbed, and assembly is easy, resulting in improved connection reliability.

To achieve the foregoing and other objectives, and in accordance with the purposes of the present invention, a vehicle-mounted alternator is provided which comprises: a stator winding having lead wires led out substantially in parallel in the axial direction of a stator core; junction conductive members having lead wire connection parts connected to the lead wires of said stator winding, and outputting connection parts connected to a rectifier, and a connecting conductor part for connecting the lead wire connecting parts to the outputting connection parts, and by which the stator coil is connected as per a predetermined connection state; and a junction connection device provided with a supporting member for securely supporting said junction conductive members.

Another aspect of the invention is a vehicle-mounted alternator wherein a stator winding has three-phase windings; the junction connection device is provided with junction conductive members on a neutral point side in which the outputting connection parts may lead a neutral point outside, and three junction conductive members on a phase voltage side in which the outputting connection parts may lead a phase voltage outside; each lead wire on the neutral point side of the three-phase windings is connected to the lead wire connection parts of the junction conductive members on the neutral point side of the junction connection device, and lead wires on the phase voltage side of the three-phase windings are respectively connected to the lead wire connection part of the junction conductive members on the phase voltage side, whereby a star connection of the three-phase windings is formed to output a three-phase alternating current from the outputting connection parts of the junction conductive member on the phase voltage side, and an AC side of the amplifier is connected to the outputting connection parts of the junction conductive member to rectify a three-phase AC output to a DC output.

Another aspect of the invention is a vehicle-mounted alternator wherein the three-phase windings have, respectively, a plurality of coils, and said plurality of coils are connected in parallel by way of the junction conductive members on the neutral point side and the junction conductive members on the phase voltage side.

Another aspect of the invention is a vehicle-mounted alternator wherein the connecting conductor parts of the junction conductive members are formed into a plate-shape, and the supporting member of an insulating material is formed into a circular arc-shaped plate integrally with said plate-shaped connecting conductor parts.

Another aspect of the invention is a vehicle-mounted alternator wherein at least one part of the connecting conductor parts of the junction conductive members is exposed out of the supporting member.

Another aspect of the invention is a vehicle-mounted alternator wherein the lead wires are connected by metallurgical joining to the lead wire connection parts of the junction connection device.

Another aspect of the invention is a vehicle-mounted alternator wherein the metallurgical joining of the lead wire connection parts of the junction connection device and the lead wires takes place on the opposite side of the stator of the supporting member.

Another aspect of the invention is a vehicle-mounted alternator wherein the rectifier has plate-shaped AC side terminals; the connecting conductor part of the junction conductive member of the junction connection device and the outputting connection parts are integrally formed of a plate-shaped conductor; and the AC side terminals of the rectifier are connected to the outputting connection parts in such a manner as to be clamped in axial direction of the stator by clamping members.

Another aspect of the invention is a vehicle-mounted alternator wherein the supporting member of the junction connection device has cutout parts on the outer periphery so that each lead wire connection part is disposed in the cutout parts and the lead wires are inserted radially from outside.

Another aspect of the invention is a vehicle-mounted alternator wherein the rotator has a cooling fan for inhaling outside air in a bracket; the junction connection device is disposed in the bracket; and the supporting member of the junction connection device and blades of the cooling fan are facing to the axial direction.

A further aspect of the invention is a vehicle-mounted alternator wherein the supporting member has an inclined part inclining to the outer periphery thereof.

A still further aspect of the invention is a vehicle-mounted alternator wherein the lead wires have partially bent parts and are connected to the lead wire connection parts of the junction connection device by way of the partially bent parts.

Additional objects, advantages and other features of the invention will be set forth in part in the description which follows and in part will become apparent to those having ordinary skill in the art upon examination of the following or may be learned from the practice of the invention.

BRIEF DESCRIPTION OF THE DRAWINGS

The invention will be described in detail with reference to the following drawings, in which like reference numerals refer to like elements.

DESCRIPTION OF THE PREFERRED EMBODIMENTS

Figure 1:
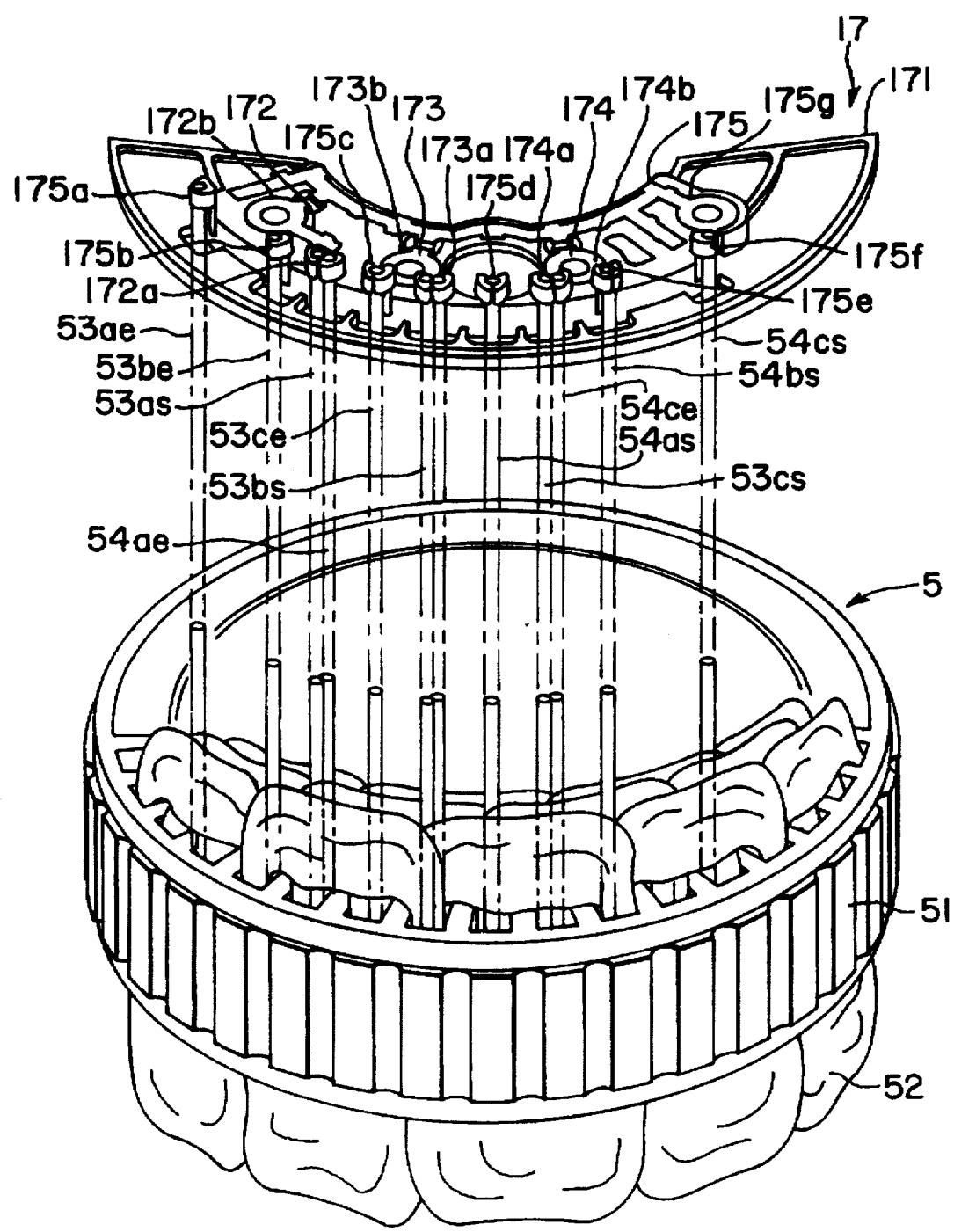
FIG. 1 illustrates a perspective view of the armature of the first embodiment according to the present invention.
Figure 2:
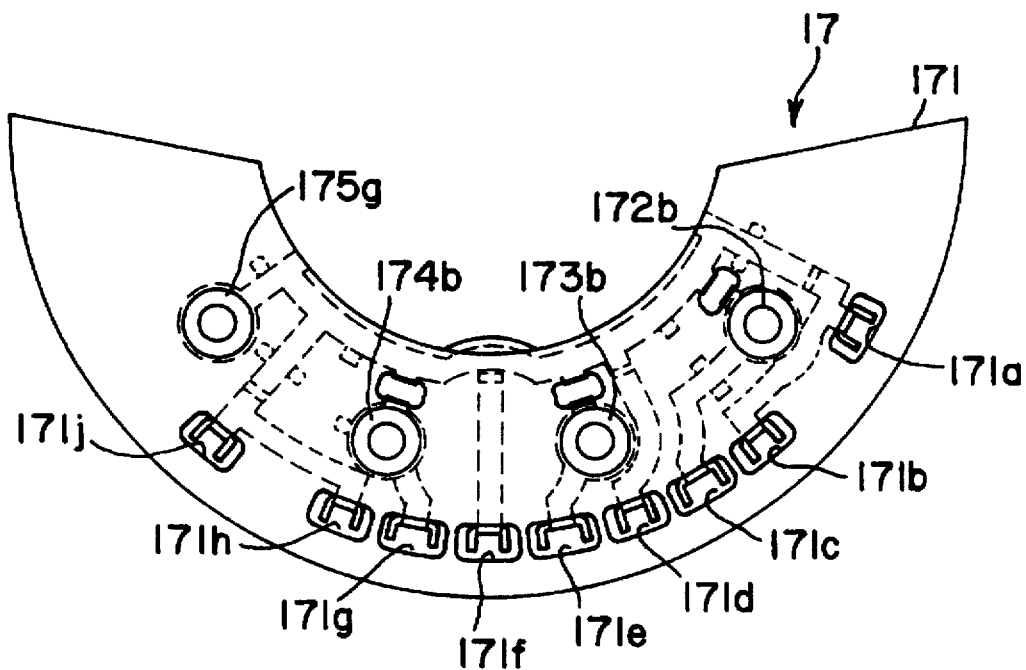
FIG. 2 illustrates a front view of the circuit board shown in FIG. 1 when looking it up from lower part of the armature of FIG. 1.
Figure 3:
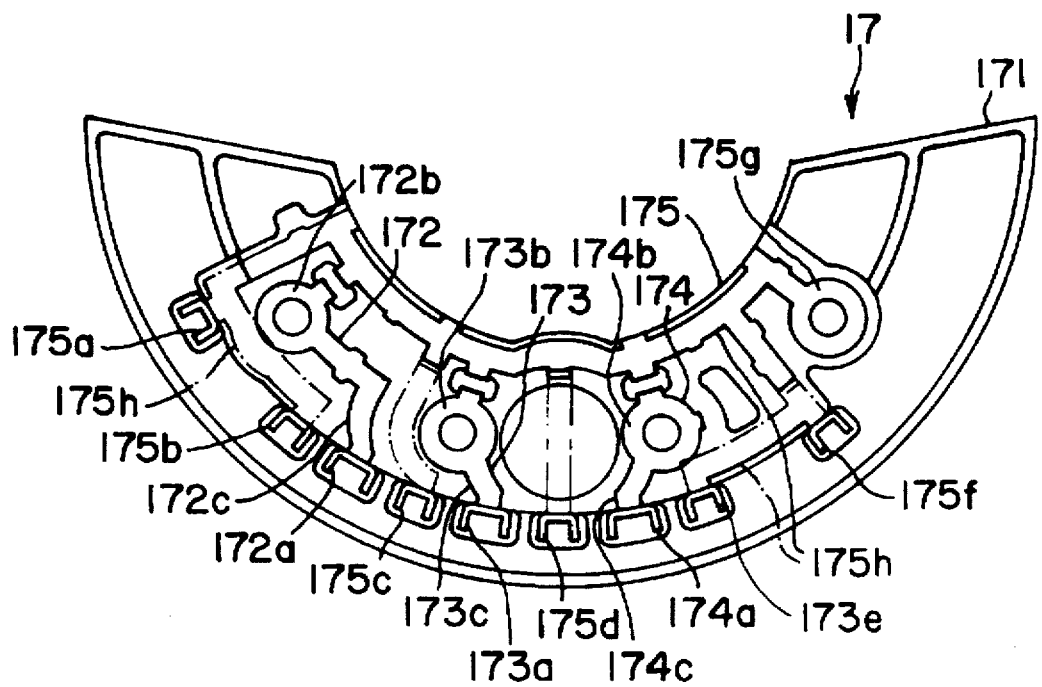
FIG. 3 is a rear view of the circuit board shown in FIG. 1 when looking it down from upper part of the armature of FIG. 1.
Figure 4:
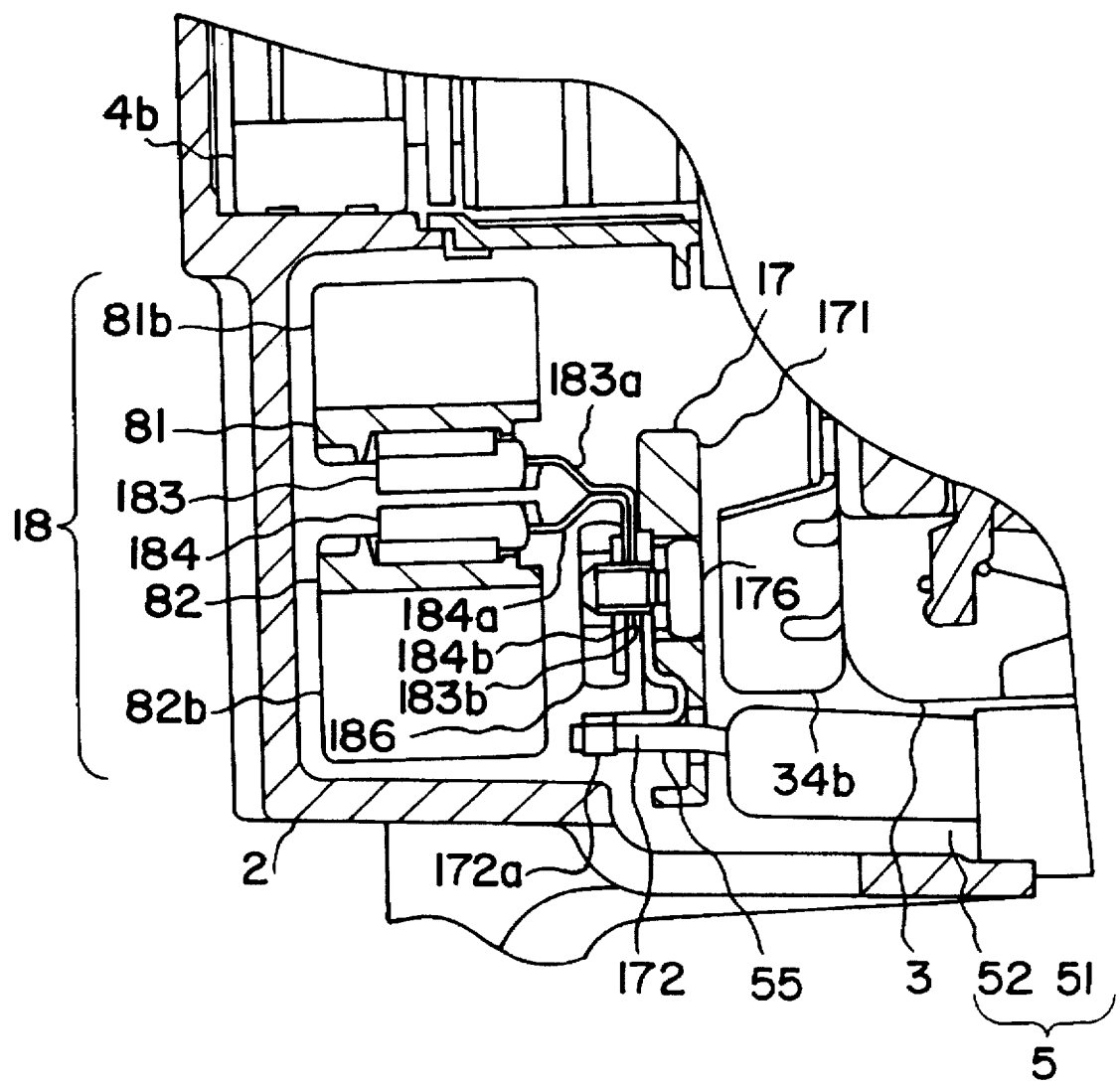
FIG. 4 is a partially sectional view showing the essential part of the generator according to the first embodiment of FIG. 1.
Figure 5:
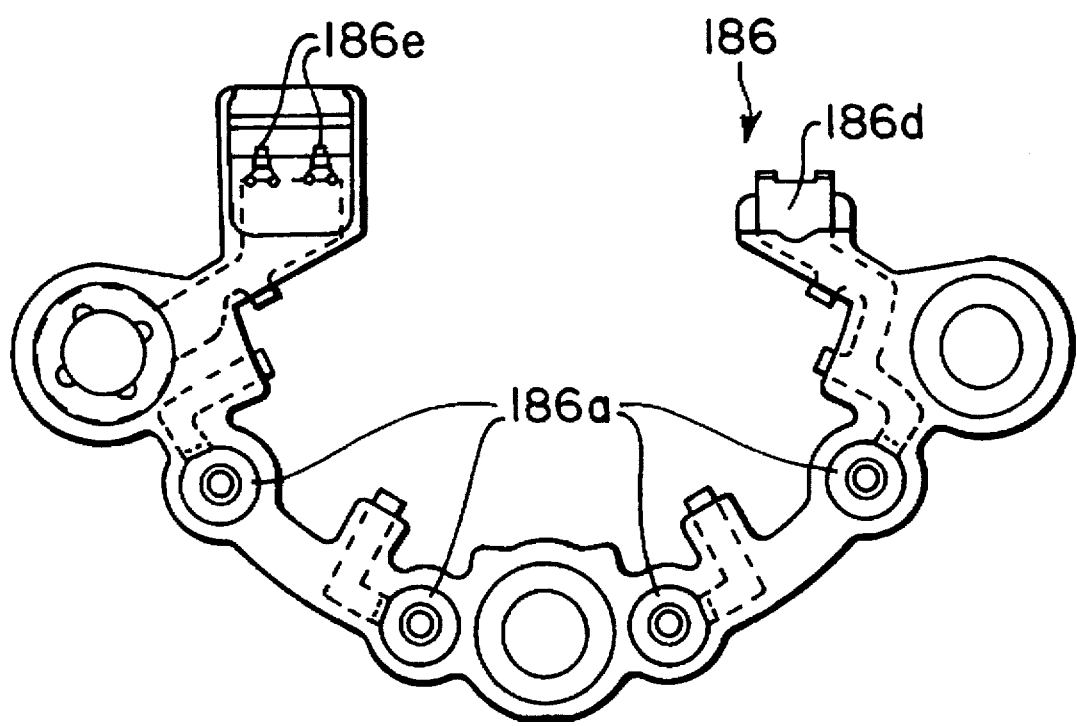
FIG. 5 is a plan view showing the auxiliary terminal plate according to the embodiment of FIG. 1.
Figure 6:
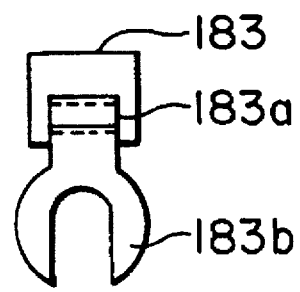
FIG. 6 is a plan view showing a terminal of the diode according to the embodiment of FIG. 1.
Figure 7:
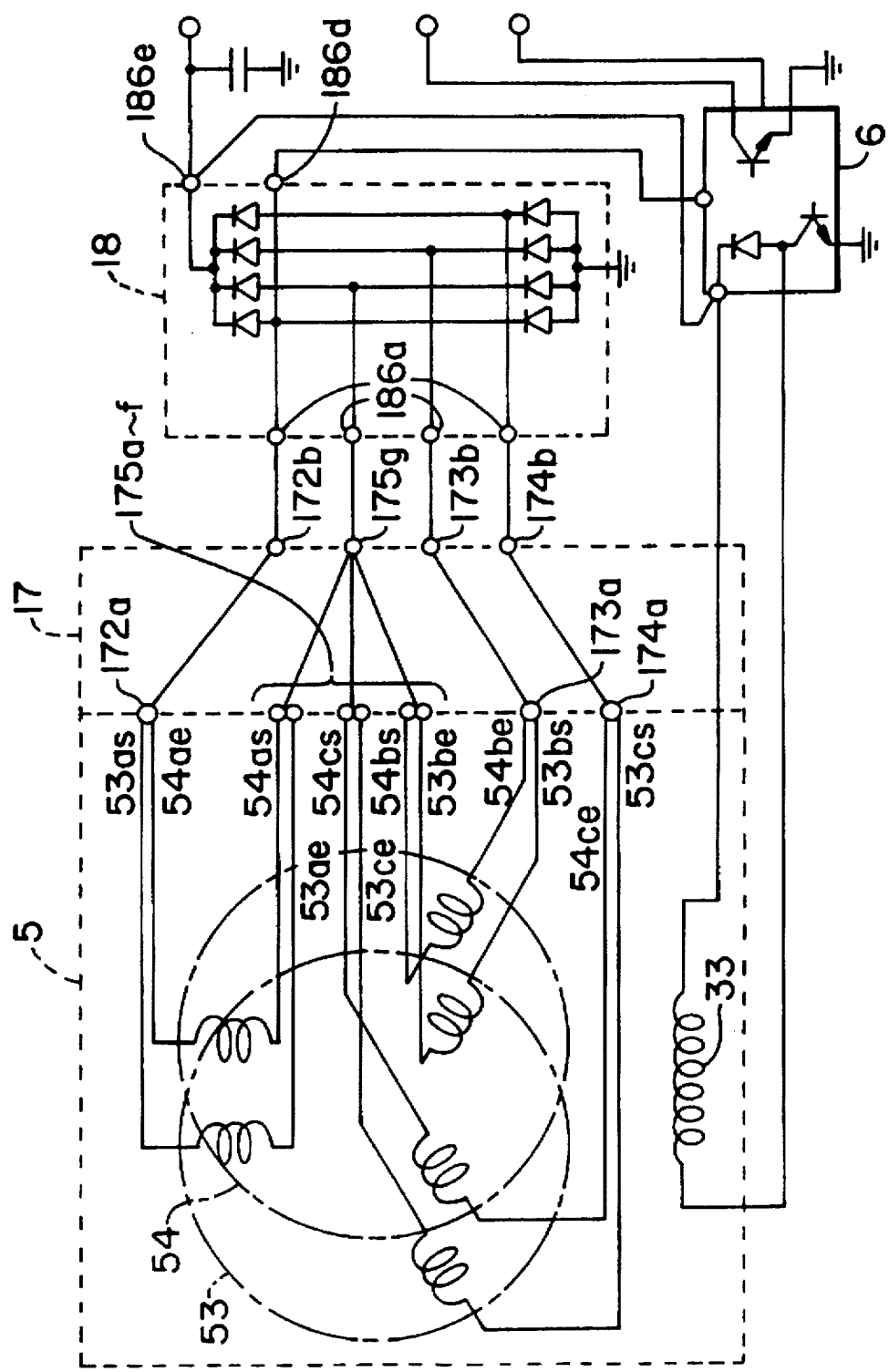
FIG. 7 is a circuit diagram of the generator according to the embodiment of FIG. 1.

FIGS. 1 to 7 show an embodiment of the vehicle-mounted alternator or generator of the present invention, and in which FIG. 1 is a perspective view of the armature, and FIG. 2 is a front view of a circuit board shown in FIG. 1 when looked up from the bottom side of FIG. 1. FIG. 3 is a front view of the circuit board of FIG. 1 when looked up from the top side of FIG. 1. FIG. 4 is a sectional view of an essential part of the generator, FIG. 5 is a plan view of the auxiliary terminal plate of the rectifier, and FIG. 6 is a plan view showing a terminal of the diode. FIG. 7 is a circuit diagram of the generator.

In the drawings, reference numeral 17 denotes a circuit board, and numeral 18 denotes a rectifier. The circuit board 17 has insert terminals 172 to 175 serving as junction conductive members and a substrate 171 serving as a supporting member. The substrate 171 being made of an insulating material for molding is formed integrally with the insert terminals 172 to 175 by insertion molding. The substrate 171 is almost circular arc plate-shaped, and reinforcing ribs are appropriately disposed on the peripheral edge portions, middle part, etc. of the circular arc on the back side thereof (i.e. the opposite side of the armature, as seen in FIG. 3).

As shown in FIG. 2, the substrate 171 is provided with rectangular windows 171a to 171j corresponding to the lead wire connection parts 172a, 173a, 174a, etc. of the insert terminals later described. The windows 171a to 171j are formed for the purpose of passing through the lead wires 53as, 53bs, 53cs, 53ae, 53be, 53bc, etc. of each phase coil of the armature winding 52. In addition, the insert terminals 172 to 175 are exposed on the back side of the substrate 171.

The insert terminals 172 to 175 are formed of the substrate 171 of an insulating material integrally with a sheet of copper plate punched into a predetermined shape, and after cutting and removing predetermined unnecessary parts, the remaining parts are separated into the insert terminals 172 to 175. The insert terminal 172 has a lead wire connection part 172a on a phase voltage side. The lead wire connection part 172a forms a circular arc, is erected toward the back side (upward in FIG. 1 and 3) and projecting toward the opposite side of the armature of the substrate 171 so as to correspond to the lead wires 53as, 54ae of the armature winding 52, and an end of the lead wire connection part 172a is open radially to outside forming almost a "u" shape so as to clamp the lead wires of round copper wire. The lead wire connection part 172a has also a connection terminal 172b serving as an outputting connection part on the disk-shaped phase voltage side in which a circular hole is provided at the center part, and a conductive plate 172c serving as a plate-shaped connecting conductor part for electrically connecting the lead wire connection part 172a and the connection terminal 172b.

The insert terminals 173, 174 have lead wire connection parts 173a, 174a on the phase voltage side. The lead wire connection parts 173a, 174a, each being positioned to form a circular arc, are erected toward the back side (upward in FIG. 1 and 3) so as to correspond to the wires 53bs–54be, and 53cs–54ce of armature winding 52, and is open radially to the outside forming almost a "u" shape so as to clamp the lead wires of round copper wire. The lead wire connection part 173a, 174a also have connection terminals 173b, 174b serving as outputting connection parts on the disk-shaped phase voltage side, in each of which a circular hole is provided at the center part, and conductive plates 173c, 174c serve as plate-shaped connecting conductor parts for electrically connecting lead wire connection parts 173a, 174a and connection terminals 173b, 174b, respectively.

The insert terminal 175 has lead wire connection parts 175a to 175f on a neutral point side. The lead wire connection parts 175a to 175f, each being positioned on the same circular arc as shown in the drawing, are erected toward the back side (upward in FIG. 1 and 3) so as to correspond to the lead wires 53ae, 53be, 53ce, 54as, 54bs, 54cs of armature winding 52, and opens radially outward forming almost a "u" shape so as to clamp the lead wires of round copper wire. The lead wire connection parts 175a to 175f also have a connection terminal 175g serving as an outputting connection part on the disk-shaped neutral point side in which a circular hole is provided at the center part, and a conductive plate 175h serving as a plate-shaped connecting conductor part for electrically connecting the lead wire connection parts 175a to 175f and the connection terminal 175g.

It is to be noted that each connection terminal 172b, 173b, 174b, 175g are projecting upward in FIG. 2 corresponding to each window 171a to 171J of the substrate 171, so that there is nothing projecting toward the armature 5 side in FIG. 1. Further, as shown in FIG. 4, the head of a bolt 176 (described later) is flush with the surface of substrate 171 of circuit board 17, thereby forming a flat surface facing cooling fan 34b.

Figure 25:
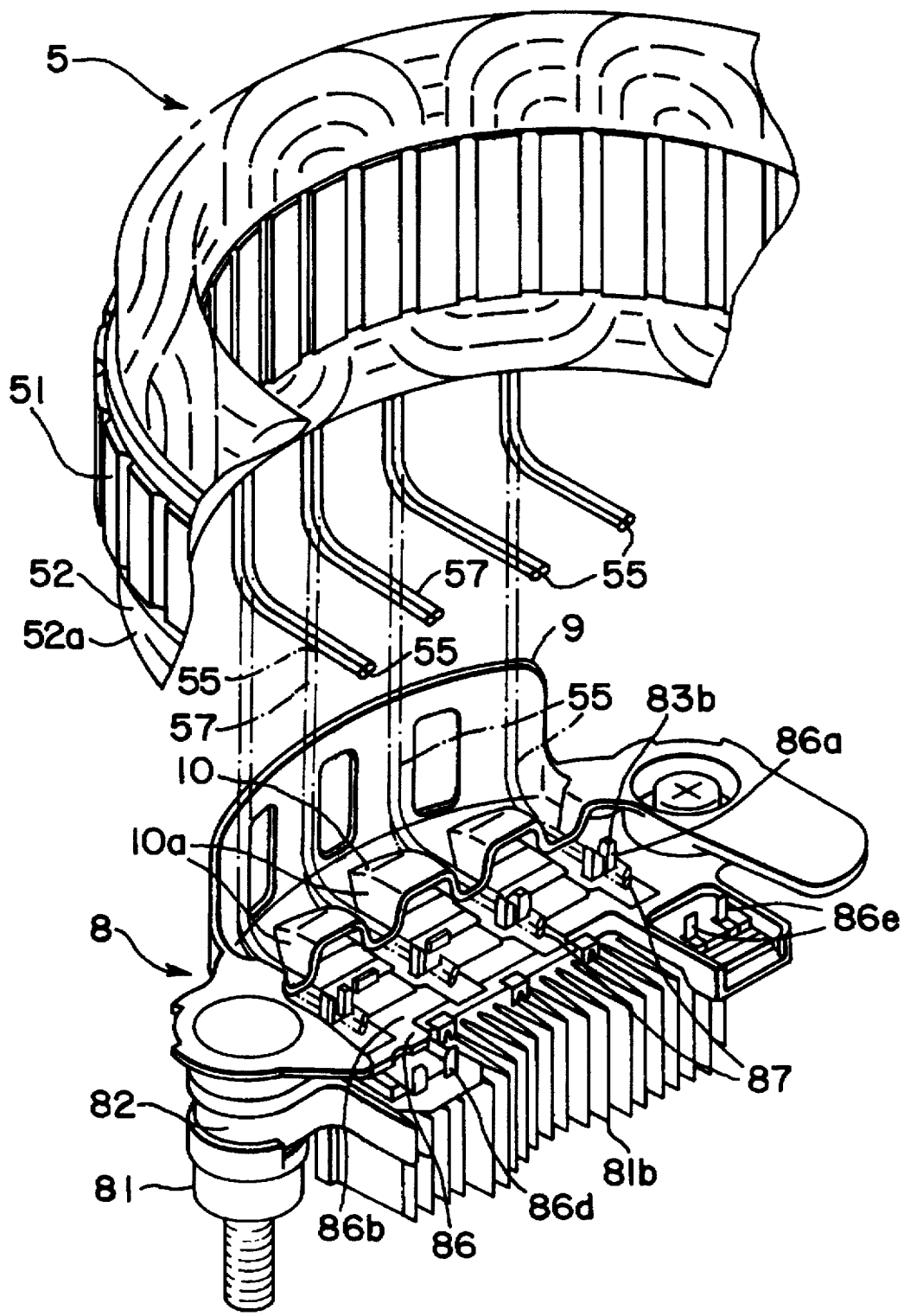
FIG. 25 is an explanatory view for explaining the assembling of the armature of the conventional generator of FIG. 20.
Figure 26:
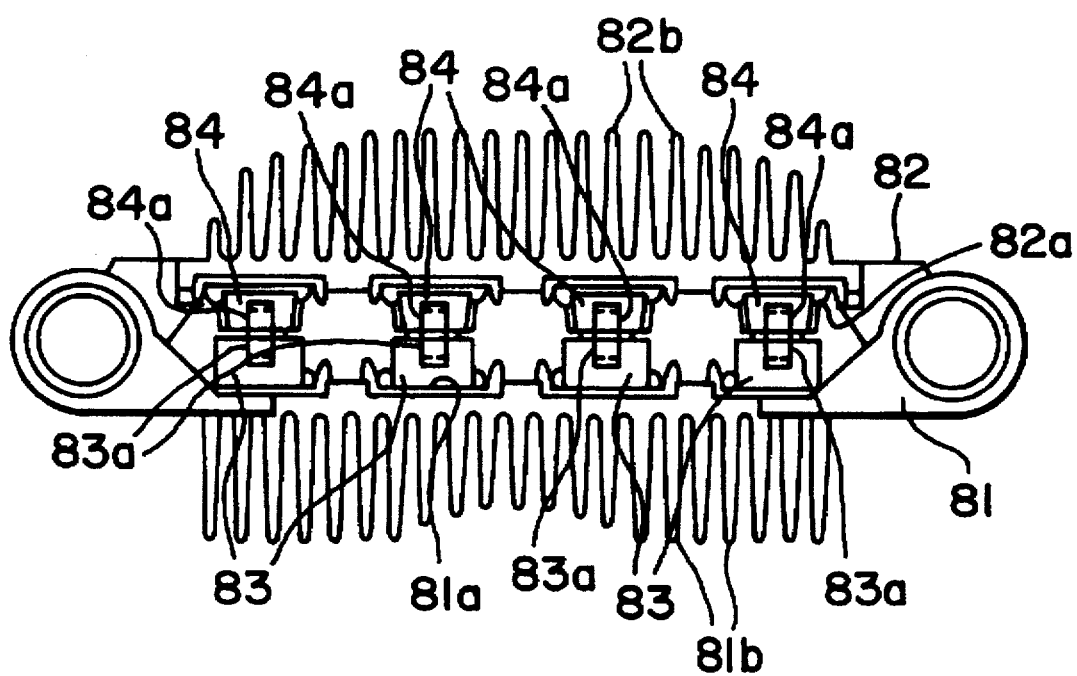
FIG. 26 is a plan view showing the detail of the cooling plate part of the rectifier of the conventional generator of FIG. 20.

The rectifier 18 is almost the same as the conventional rectifier shown in FIGS. 25 and 26, but there is a difference in the aspect of arrangement of the auxiliary terminal plate 186 and shape of the terminals 183b, 184b of the diodes 183, 184. As shown in FIG. 5, in the auxiliary terminal plate 186, four terminals 186a and auxiliary terminals 186d, 186e are disposed so that each terminal 186a may face to the connection terminals 172b, 173b, 174b, 175g when combined with the circuit board 17, and a circular arc strap-shaped insulating support plate 186b of an insulating material is formed by insertion molding integrally with those terminals. In addition, the terminals 186a are respectively provided with female screws.

The auxiliary terminal 186d is formed of copper plate integrally with a terminal 186a for the a-phase on the right end in FIG. 5, and the front end thereof, raised by cutting, supplies a voltage signal, for controlling a voltage of the generator, to the voltage regulator 6 in the same manner as the conventional auxiliary terminal 86d in FIG. 25. Further, although not shown in detail, the auxiliary terminal 186e comes in electrical contact with the cooling plate 81 on the positive electrode side, and supplies the output of the rectifier 18 to the field winding 33 when the auxiliary terminal plate is superposed on the cooling plates 81, 82 in the same manner as the auxiliary terminal plate 86 shown in FIG. 25 (as seen in the circuit diagram in FIG. 7).

The auxiliary terminal plate 186 of the above construction is prepared by the steps of forming the substrate 186b by insertion molding integrally with a sheet of copper plate punched into a predetermined shape, cutting and removing unnecessary parts, and separating the remaining part into the terminals 186a and the auxiliary terminals 186d, 186e.

As shown in FIG. 6, the front end of the terminals 183b, 184b of the diodes 183, 184 is claw-shaped, and the lead 183a is bent to be L-shaped and clamped to the connection terminals 172b, 173b, 174b, 175g of the circuit board 17 by a bolt 176 serving as a clamping member, thus being electrically connected.

Connection between circuit board 17 and the armature winding 52 is performed in the following manner. The lead wires 53ae, 53be, 53ce at the winding start of each phase coil of the first three-phase winding 53 serving as lead wires on the neutral point side, the lead wires 54as, 54bs, 54cs at the winding start of each phase coil of the second three-phase winding 54 serving as lead wires on the same neutral point side, lead wires 53as, 53bs, 53cs at the winding start of each phase of the first three-phase winding serving as lead wires on phase voltage side, and the lead wires 54ae, 54be, 54ce at the winding end of each phase coil of the second three-phase winding on the same phase voltage side, form a circular arc, and project almost in parallel with the axis of armature core 51, wherein each phase coil of each three-phase winding 53, 54 is inserted in the armature core 51. Keeping such a state, each lead wire is caused to pass through the windows 171a to 171j provided on substrate 171 and inserted, respectively, in the lead wire connection parts 172a, 173a, 174a, 175a to 175f projecting on the side opposite to armature 5 of substrate 171.

Thereafter, the lead wires are secured to each lead wire connection part by clamping the lead wires, which are then welded together and, thereby, electrically connected. For example, the lead wire 53ae passes through the window 171a and is connected to the lead wire connection part 175a.

In the same manner, the other lead wires 53be, 53ce, 54as, 54bs, 54cs are connected to the corresponding lead wire connection parts 175b to 175f, and are guided to connection terminal 175g on the neutral point side by a conductive plate 175h. Further, the lead wires 53as and 54ae pass through the window 171c, and are connected to the lead wire connection part 172a and guided to the connection terminal 172b.

Then, the armature core 51 is fitted in the rear bracket 2 in which the rectifier 18 is preliminarily incorporated. At this time, the position of the four connection terminals 172b, 173b, 174b, 175g of the junction connection device is adjusted to meet the position of the female screws of the terminals 186a of auxiliary terminal plate 186, and then assembled. At the same time, the terminals 183b, 184b of the diodes 183, 184 are respectively inserted between the terminals 186a of the auxiliary terminal plate 186 and the connection terminals 172b, 173b, 174b, 175g. It is to be noted that, at this time, as the rotor 3 has not yet been inserted, the bolt 176 is caused to pass through each connection terminal from the right-hand side in FIG. 4 to be in screw-engagement with the female screws of the terminals 186a for clamping in the axial direction of the armature 5, thus the terminals 183b, 184b of the diodes 183, 184 are electrically connected to the connection terminals 172b, 173b, 174b, 175g, respectively. In this manner, the assembly as shown in FIG. 4 is achieved.

In the generator just described, each lead wire 53as, 53bs, 53cs, 53ae, 53be, 53ce, 54as, 54bs, 54cs, 54ae, 54be, 54ce of each phase coil of the three-phase windings of the armature 5 is led out almost in parallel to the axial direction of the armature 5. Further, both phase coils are respectively connected in parallel byway of the insert terminals 172 to 175 of the circuit board 17, whereby the three-phase windings featured by the invention are formed, and these three-phase windings form a three-phase star connection. Furthermore, the phase voltage and neutral point are led outside by way of the connection terminals 172b, 173b, 174b, 175g.

Since the generator is constructed as described above, every lead wire can be led out from the corresponding slots 51a almost in parallel to the axial direction of the armature 5, and connected to each lead wire connection part of the circuit board 17. Accordingly, bending work to connect the three-phase lead wires 55 and junction lines 57 to the rectifier 18, and arranging of the guides 10, is eliminated, thereby overcoming several disadvantages of the conventional generator. Further, there is no need for twisting the lead wires to form the connection at neutral points 53n, 54n, and also no complicated wiring for connecting to the neutral point junction lines 53nn, 54nn or to the rectifier 18 is required, either. As a result, arranging the connections is simplified, and the connection is easily achieved without applying an external bending force; therefore, reliability of the connection is improved.

Figure 21:
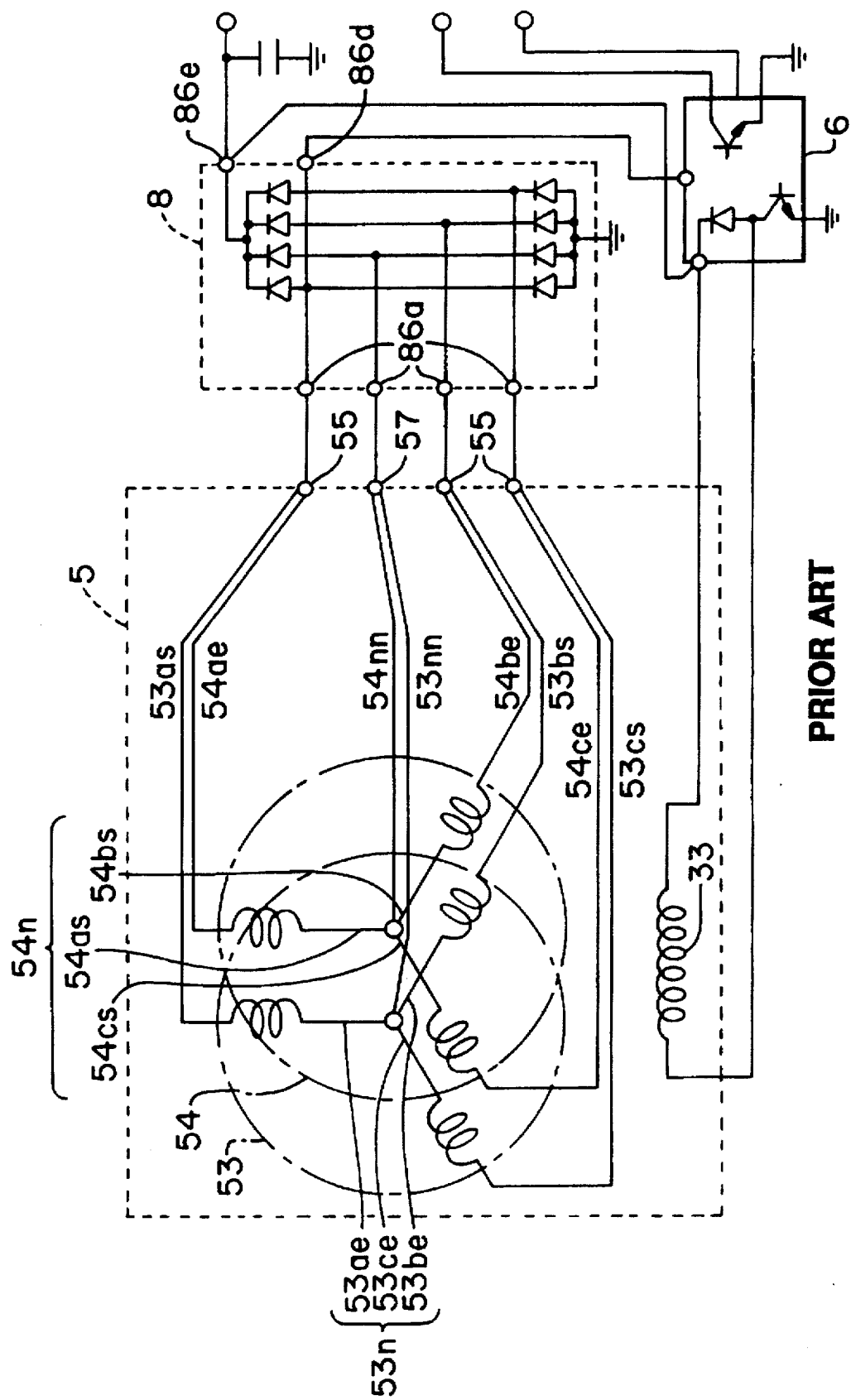
FIG. 21 is a circuit diagram showing a circuit of the conventional generator of FIG. 20.
Figure 22:
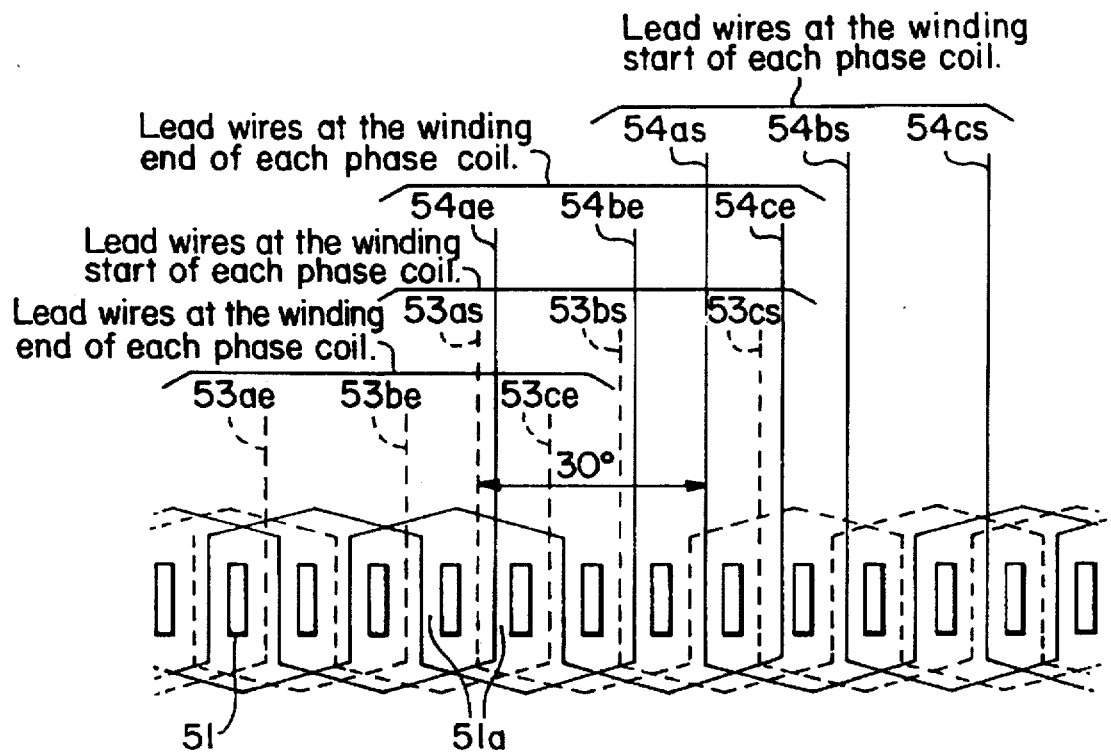
FIG. 22 is a schematic view showing the winding state of the armature winding of the conventional generator of FIG. 20.
Figure 23:
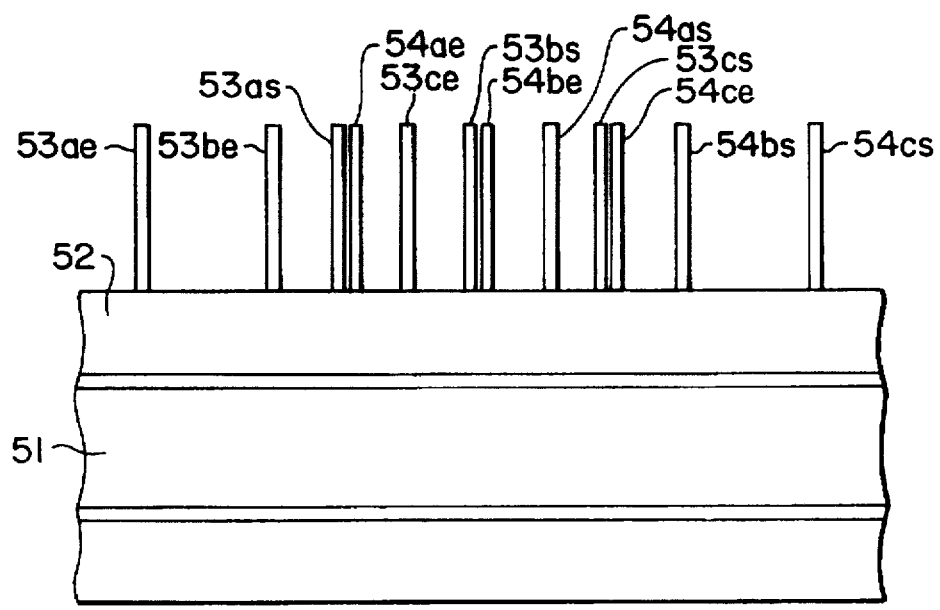
FIG. 23 is an explanatory view showing an arrangement of the lead wires of the armature winding of the conventional generator of FIG. 20.
Figure 24:
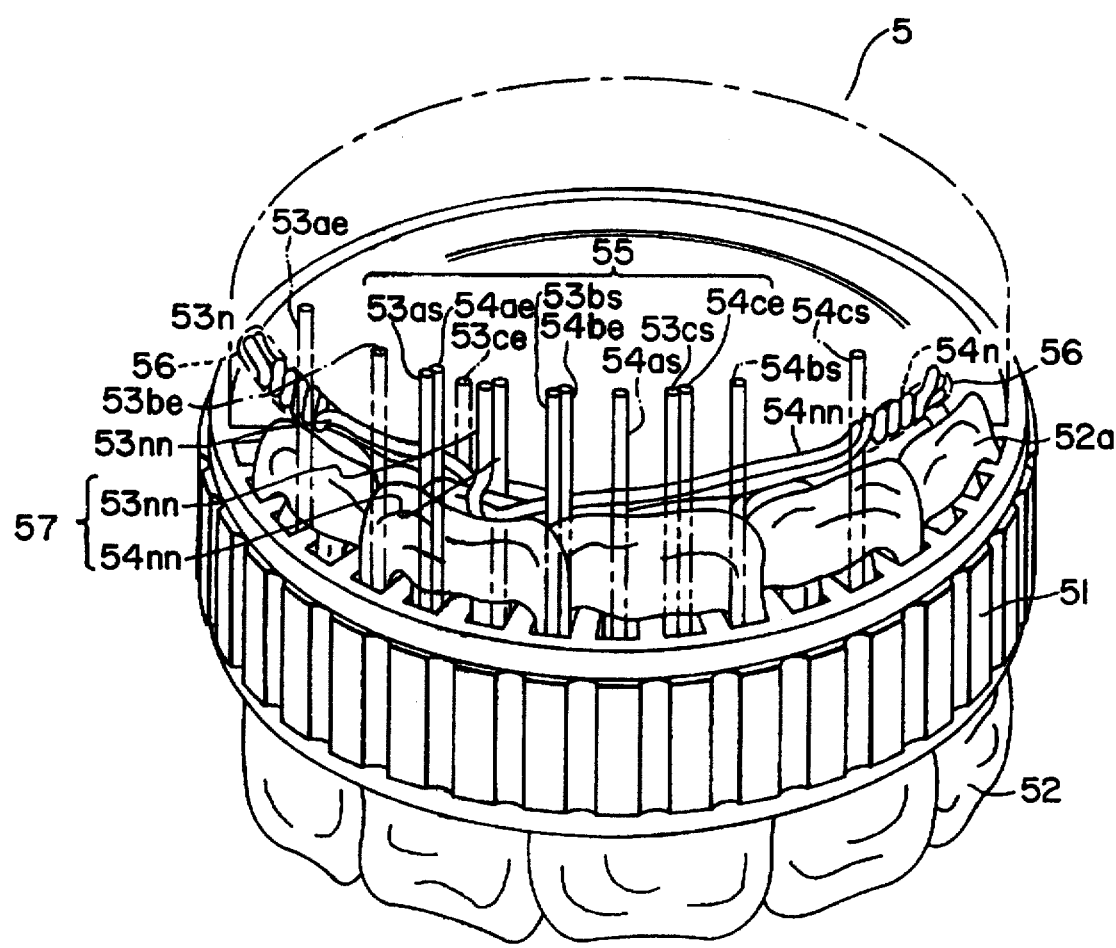
FIG. 24 is a perspective view of the armature of the conventional generator of FIG. 20.
Figure 27:
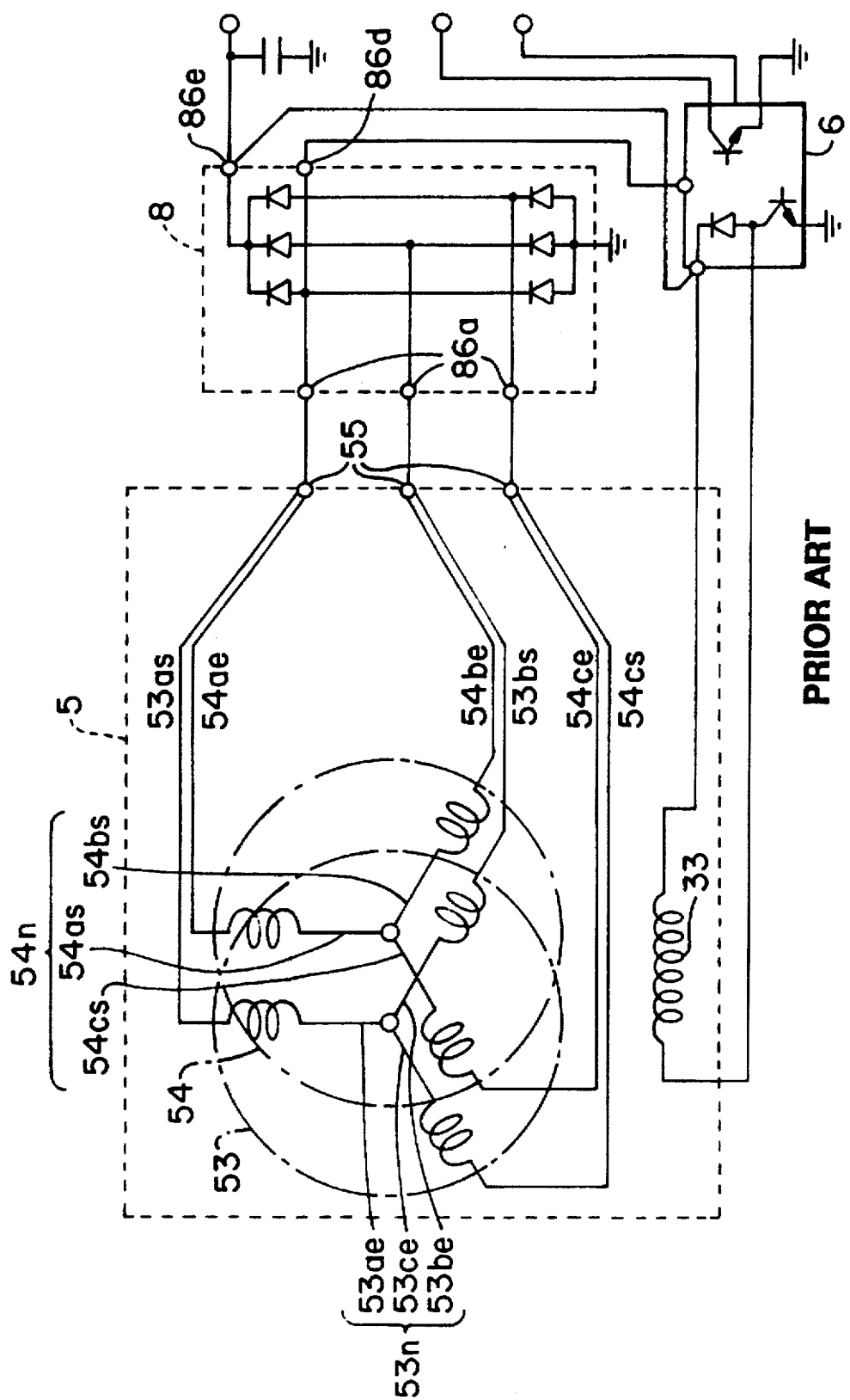
FIG. 27 is a circuit diagram showing another circuit of the conventional generator.
Figure 28:
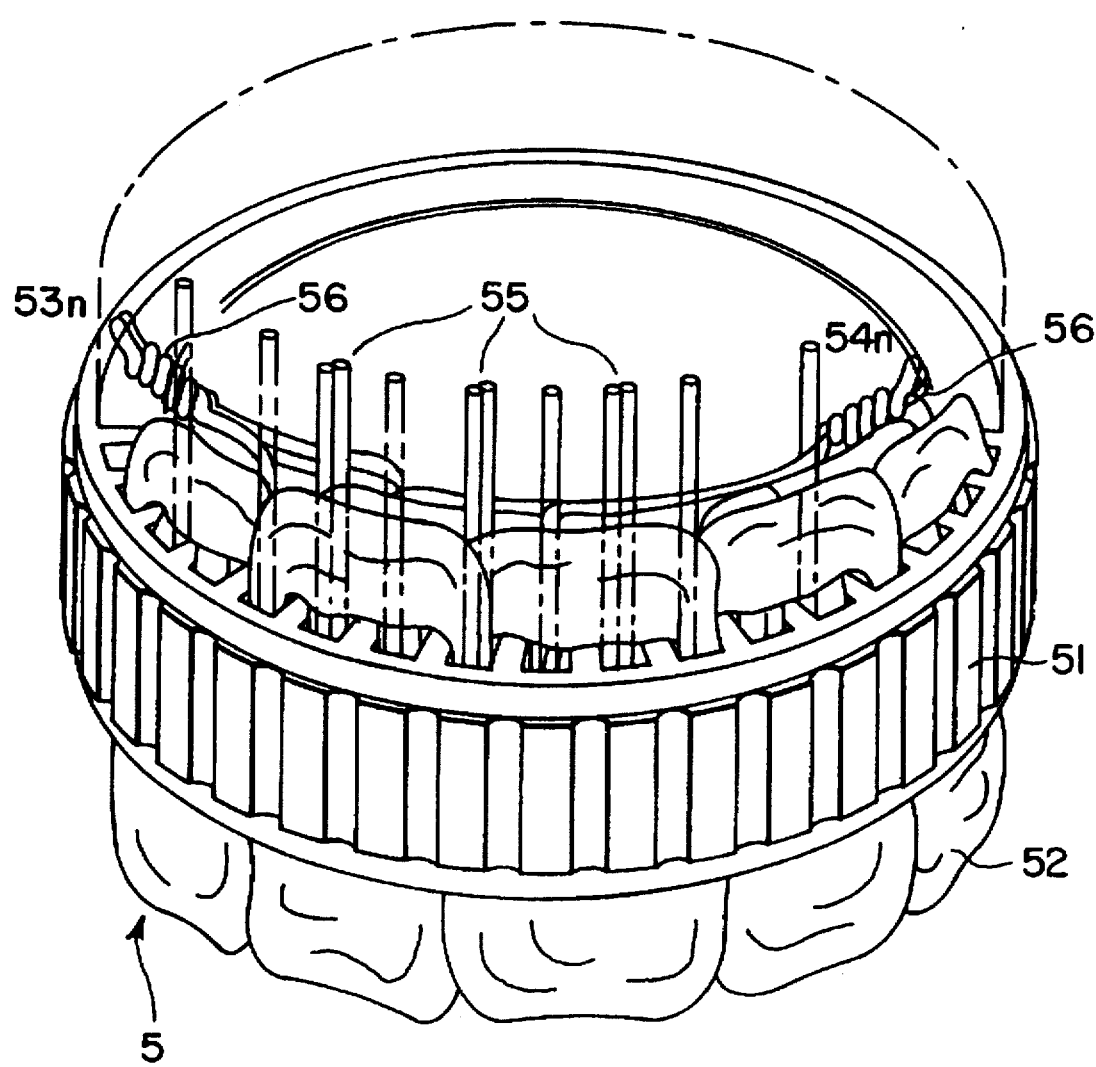
FIG. 28 is a perspective view of the armature having the circuit shown in FIG. 27.

It is to be noted that there is no difference in the complexity of the manufacturing process between a generator as shown in FIGS. 21 and 24, which requires the neutral point output, and a generator as shown in FIGS. 27 and 28, which does not require any neutral point output. In other words, in the generator according to this embodiment of the invention, any diode can be omitted, and there is no need to incorporate bolt 176 in the connection terminal 175g, serving as an outputting connection parts on neutral point side; this means that only one junction connection device is sufficient for multiple arrangements. As a result, the junction connection device can be standardized, and manufacturing steps can be simplified.

Further, since the lead wires of the armature winding and each lead wire connection part of the circuit board are connected before combining and connecting them to the rectifier, assembly is simplified. Furthermore, since every lead wire is electrically connected by welding, and is clamped to the terminals 183b, 184b of the diodes 183, 184 by the bolt 176 through auxiliary terminal plate 186, there is no need of soldering, resulting in easy assembling work and high reliability.

Since the circuit board 17 has the plate-shaped substrate 171 formed integrally with the plate-shaped insert terminals 172 to 175, the thickness of the circuit board 17 (i.e. dimensions of the armature 5 in axial direction thereof) can be small, and the length of the generator in the axial direction thereof is not elongated. Further, since the insert terminals 172 to 175 are partially exposed, and heat radiation is improved, temperature rise is thus restricted. Furthermore, since the lead wire connection parts project from the circuit board to the side opposite the armature, clamping and welding steps with respect to the lead wires are easily performed.

Since the junctions of complicated structure between the lead wire connection parts of the circuit board 17 and the lead wires project to the side opposite the armature, and since the side facing the cooling fan is flat and does not project bolt 176, the side facing the blades of the cooling fan is flat. Thus, fanning efficiency and cooling performance are improved, and noise is reduced.

Another embodiment of the vehicle-mounted alternator or generator is contemplated as follows.

In cases wherein armature 5 has only the first three-phase winding 53 (i.e., in case that the three-phase winding featured by the invention is formed of one coil of each phase, and the lead wires of each phase coil is six in total), then lead wire connection parts 175d, 175e, 175f are empty, and only one lead wire is connected to each of the other lead wire connection parts 172a, 173a, 174a, respectively. Also, in this case, a complete generator is formed in the same manner as the foregoing example.

It is also preferable, as a matter of course, to form the opening width of lead wire connection parts 172a, 173a, 174a to have the same opening width as that of only one lead wire, in the same manner as the lead wire connection part 175a, etc., but having a larger depth, and to superpose two lead wires to be clamped together, so that the same opening is available for one lead wire or for two lead wires.

By employing this construction, even if the number of lead wires varies, a single circuit board can still be used. When constructed in the same manner as the embodiment shown in FIG. 1, there is no difference in the complexity of the manufacturing process between a generator (as shown in FIGS. 21 and 24) which requires the neutral point output, and a generator (as shown in FIGS. 27 and 28) which does not require the neutral point output. In other words, in the generator according to the invention, any diode can be omitted, and there is no need of incorporating the bolt 176 in the connection terminal 175g, serving as an outputting connection part on the neutral point side.

It is also preferable to employ a further circuit board in which opening of the lead wire connection parts 172a, 173a, 174a is formed to have the same width as that for only one lead wire in the same manner as the lead wire connection part 175e, etc.

Figure 8:
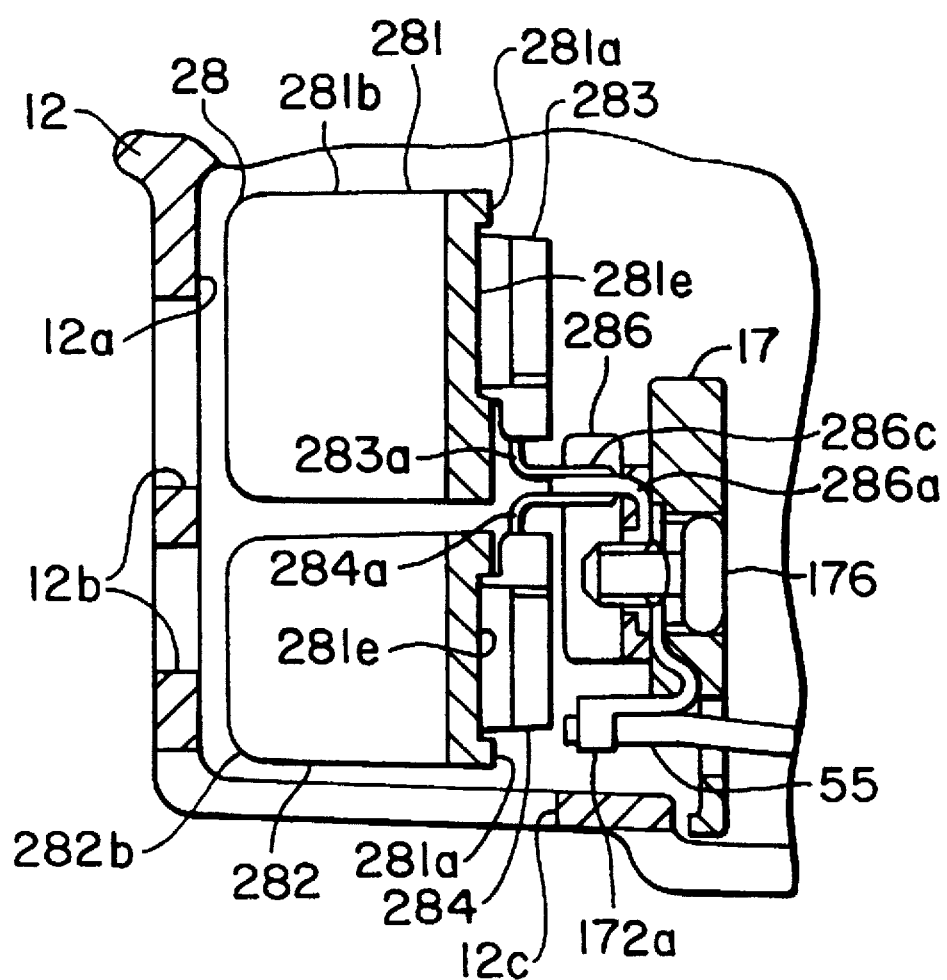
FIG. 8 illustrated a partially sectional view showing the essential part of the generator according to another embodiment of the invention.
Figure 9:
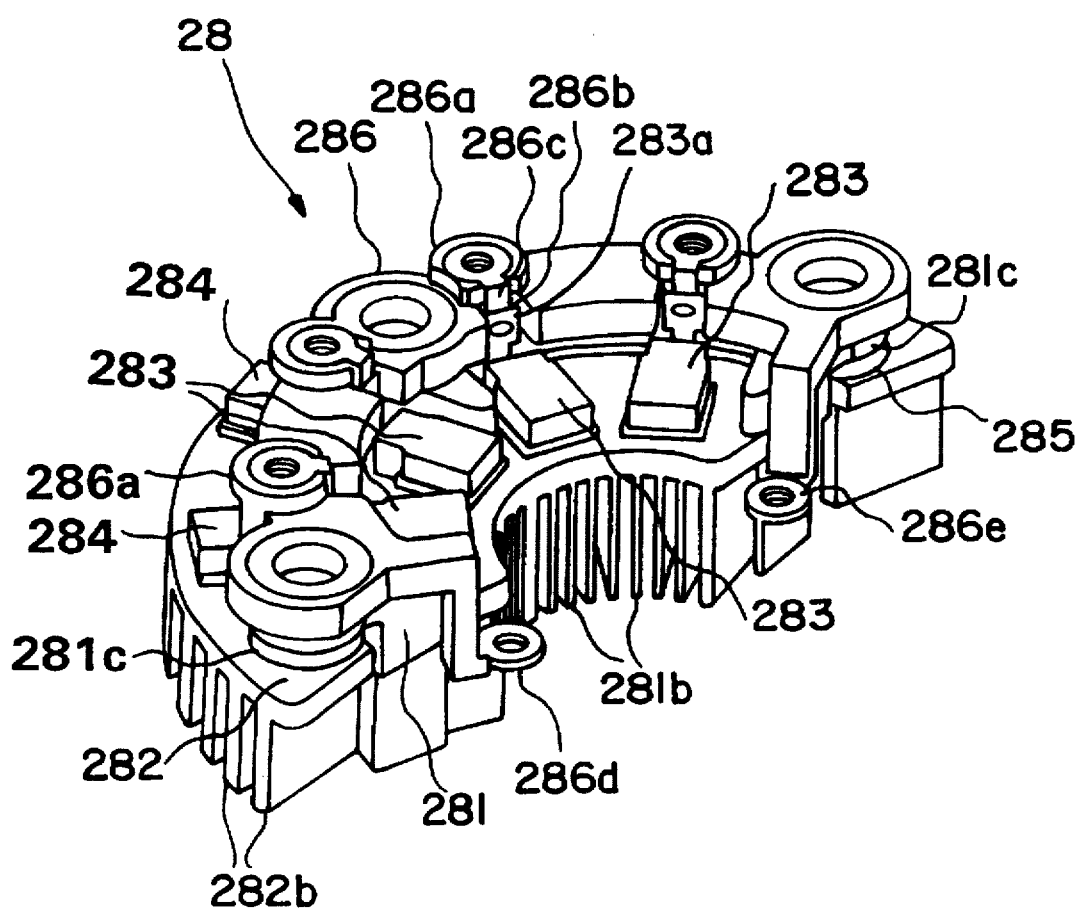
FIG. 9 is a perspective view of the rectifier according to the second embodiment of FIG. 8.
Figure 10:
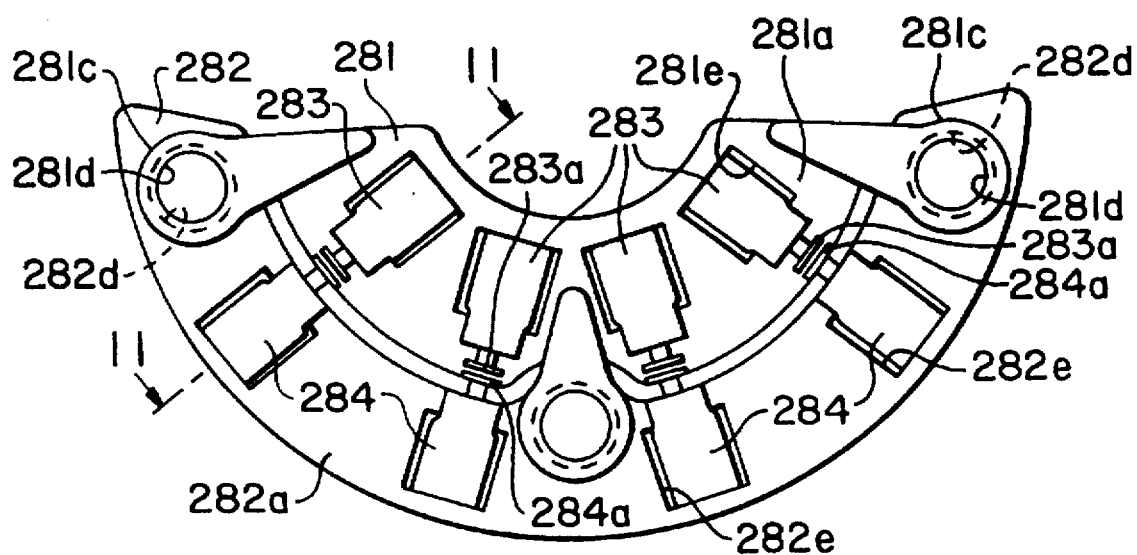
FIG. 10 is a plan view showing the cooling plate part of the rectifier of the embodiment of FIG. 8.
Figure 11:
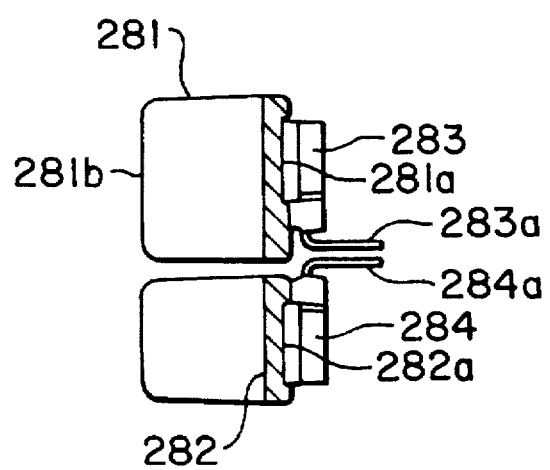
FIG. 11 is a sectional view showing a section of the cooling plate part taken along the line A—A of FIG. 10.
Figure 12:
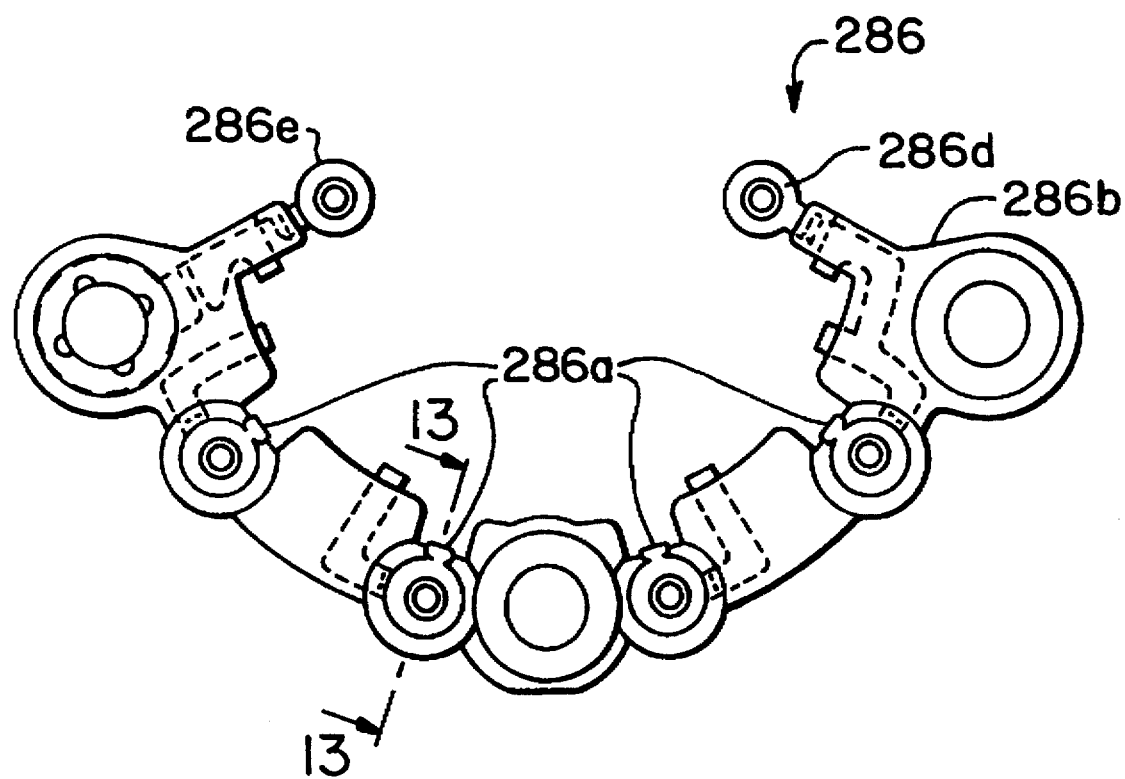
FIG. 12 is a plan view showing the auxiliary terminal plate of the rectifier according to the embodiment of FIG. 8.
Figure 13:
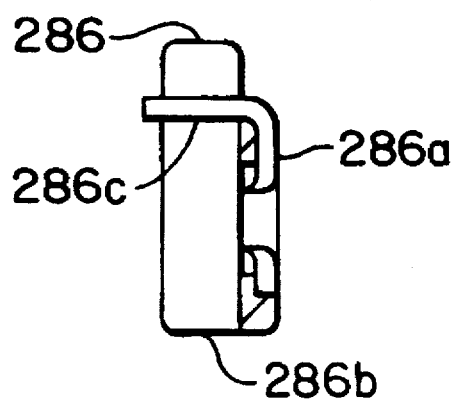
FIG. 13 is a sectional view showing a section taken along the line B—B of FIG. 12.

FIGS. 8 to 13 show, in combination, another embodiment of the vehicle-mounted alternator or generator of the present invention. Although the arrangement of the rear bracket and rectifier is different in this embodiment, the circuit board is the same as that of the foregoing embodiment shown in FIG. 1. FIG. 8 is a partially sectional view of an essential part of the generator, FIG. 9 is a perspective view of the rectifier, FIG. 10 is a plan view showing the cooling plate part of the rectifier, and FIG. 11 is a sectional view of the cooling plate part taken along line A—A in FIG. 10. FIG. 12 is a plan view of the auxiliary terminal plate of the rectifier, and FIG. 13 is a sectional view of the auxiliary terminal plate taken along line B—B in FIG. 12. The circuit diagram of the generator is the same as that shown in FIG. 7.

Figure 20:
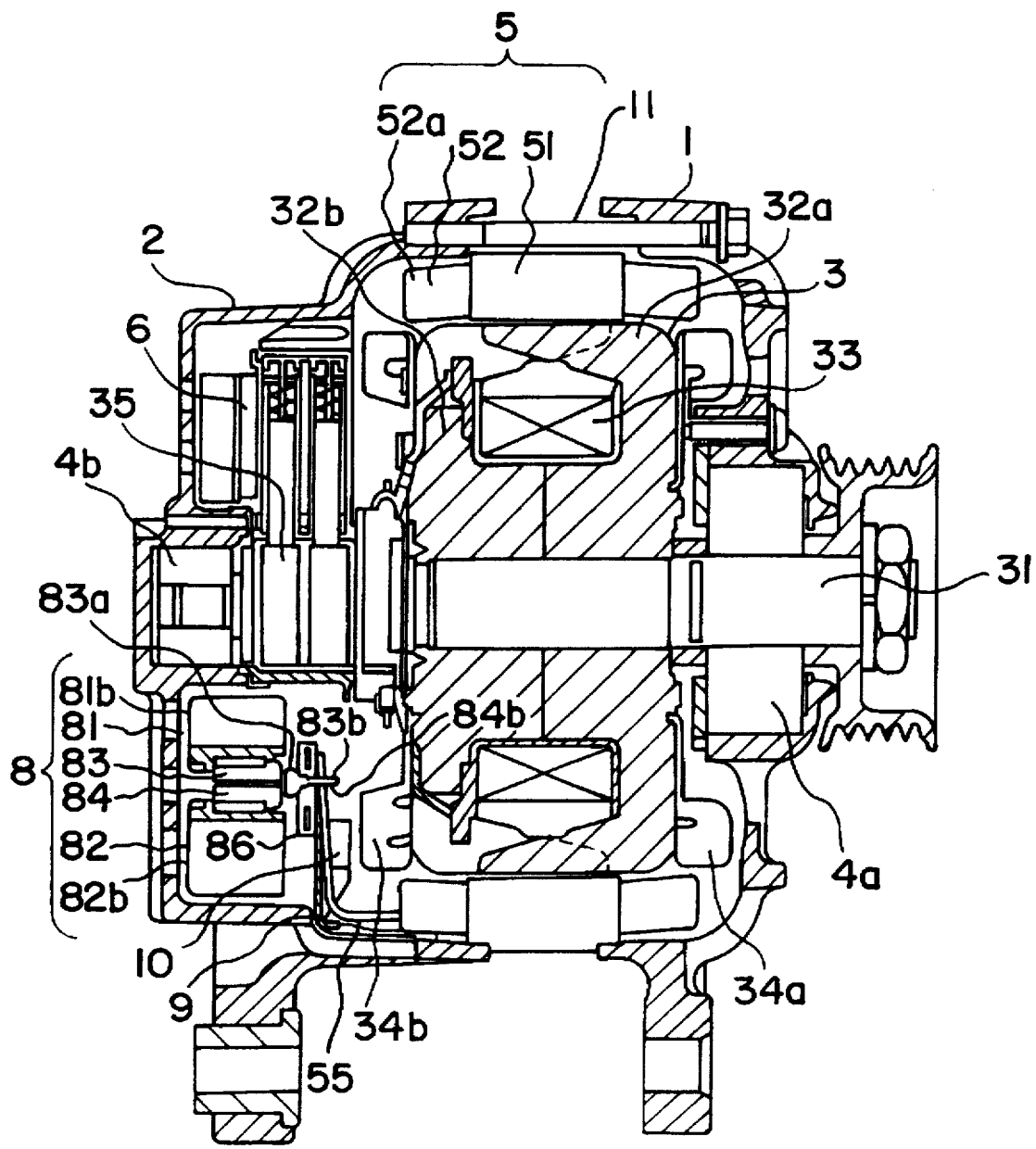
FIG. 20 is a sectional view showing the conventional generator.

In the drawings, reference numeral 12 denotes a rear bracket wherein the position and shape of the ventilating holes are different from the conventional ones as shown in FIG. 20. The rear bracket 12 is shaped like hollow cylinder having a bottom wall 12a (on the left-hand side in the drawing), and ventilating holes 12b provided through the bottom wall 12a in the axial direction, and a ventilating hole 12c provided radially through the outer periphery.

Next, the arrangement of the rectifier 28 is explained with reference to FIGS. 8 to 13. Reference numeral 281 denotes a cooling plate on a positive electrode side formed into an almost circular, arc-shaped strap, and one side of which is used as a flat mounting face 281a while, on the other side, heat radiating fins 281b projecting toward the left in FIG. 8 (downward in FIG. 9) are provided around the rotary shaft 3.

As shown in FIGS. 9 and 10, superposing parts 281c projecting in an outer diametral direction are respectively disposed at three places, two ends and middle part, in the circular-arc direction (peripheral direction) of the cooling plate 281 so as to superpose on a later described cooling plate 282 in an axial direction (of the rear bracket 12), and these superposing parts are provided with fixing holes 281d.

One of the three fixing holes 281d (as seen in FIG. 10) permits the rear bracket 12 to pass through (from the left in FIG. 8) to be used as a B terminal connected to a battery (not shown). In this embodiment, the fixing hole located at the middle part is used with the B terminal, although not shown. The cooling plate 281 provided with the mentioned radiating fins 281b, superposing part 281c, etc. is solidly formed of an aluminum alloy by die casting.

Further, the mounting face 281a is radially provided with four diode mounting holes 281e, each forming a recessed rectangle to which the later described diode 283 on positive electrode side is soldered.

Reference numeral 282 is a cooling plate of the negative electrode side formed into an almost circular arc-shaped strap having a curvature radius larger than that of cooling plate 281, and one side of which is used as a flat mounting face 282a while, on the other side, heat radiating fins 282b project downward (as seen in FIG. 9) around rotary shaft 3. As shown in FIG. 10, the cooling plate 282 is provided with fixing holes 282d at the part superposing on the superposing parts 281c of the cooling plate 281 in the axial direction of the rotary shaft 3. The mounting face 282a is radially provided with four diode mounting holes 282e each forming a recessed rectangle to which the later described diode 284 on negative electrode side is soldered.

The cooling plate 282 provided with the mentioned radiating fins 282b, diode fixing holes 282e, etc. is solidly formed of an aluminum alloy by die casting. The fin elements of heat radiating fins 281b and heat radiating fins 282b have the same pitch angle. This arrangement intends, as described later, to adjust the position of the fin elements of both heat radiating fins to improve the flow of cooling air sent by cooling fan 34b.

Further, diode fixing holes 281e, 282e are recessed in view of the positioning of the diodes 283, 284, and prevent solder from flowing out (as described later).

As shown in FIG. 8, the cooling plate 282 on negative electrode side is accommodated in the rear bracket 12 with a predetermined space radially on the outside of the cooling plate 281 on positive electrode side, so that the cooling plate 282 is radially superposed on the cooling plate 281 and that the mounting faces 281a, 282a are located on the same plane perpendicular to the rotary shaft 3. The fin elements of the heat radiating fins 281b, 282b are radially superposed so that cooling air may flow effectively through and among the fin elements.

Reference numerals 283, 284 denote diodes on the positive electrode side and on the negative electrode side, respectively. These diodes are almost the same as the diodes 83, 84 shown in FIG. 4, but are different in that the leads 283a, 284a led out on the anode side or cathode side are bent to be L-shaped (as shown in FIG. 11), and end portions thereof face each other with a predetermined radial distance (as seen in FIG. 10). In the diode 283 on the positive electrode side, the electrode surface on the cathode side thereof is soldered to the diode mounting hole 281e of the cooling plate 281 so as to secure a satisfactory electrical and thermal contact state. In the diode 284 on the negative electrode side, the electrode surface on the anode side thereof is likewise soldered to the diode mounting hole 282e of the cooling plate 282.

In cooling plate 281 on the positive electrode side, and in cooling plate 282 on the negative electrode side, fixing holes 281d, 282d are superposed in an insulating manner by way of a hollow cylindrical mold insulator 285 (as seen in FIG. 9) having a flange in the middle part.

The auxiliary terminal plate 286 is provided with four terminals 286a, auxiliary terminals 286d, 286e of a copper plate disposed radially as shown in FIG. 12 corresponding to the positions of the leads 283a, 284a of the diodes 283, 284 (as shown in FIG. 10), and a circular arc-shaped insulating support plate 286b of an insulating material formed integrally therewith. In the same manner as the auxiliary terminal plate 186 shown in FIG. 5, the auxiliary terminal plate 286 is prepared by the steps of forming the substrate 286b by insertion molding integrally with a sheet of copper plate punched into a predetermined shape, cutting and removing unnecessary parts, and separating the remaining part into the terminals 286a and the auxiliary terminals 286d, 286e. In addition, the terminals 286a are respectively provided with female screws at the parts to which burring was applied. Further, as shown in FIG. 13, a tongue 286c, connected to the leads 283a, 284a, is formed by being bent from the terminal 286a to form an L-shape.

The auxiliary terminal 286d is formed of a conductor integrally with the terminal 286a for the a-phase (on the right end in FIG. 12, and the left end in FIG. 9), and supplies a voltage signal, for controlling a voltage of the generator, to the voltage regulator 6. The auxiliary terminal 286e is electrically connected to the periphery of the fixing hole 281d (as seen in FIG. 10) of the superposing part 281c on the right hand of the cooling plate 281 and supplies an output of the rectifier 28 (as seen in the circuit diagram of FIG. 7) when the auxiliary terminal plate 286 is superposed on the cooling plates 281, 282 (as shown in FIG. 9).

Now, the assembly process of the rectifier 28 is hereinafter described with reference to FIG. 9. Four diodes 283, 284 are preliminarily soldered to each of the cooling plates 281, 282, respectively. Then, the cooling plate 281 on the positive electrode side is put on the internal diameter side of the cooling plate 282 on the negative electrode side. At this time, the fin elements of the two heat radiating fins 281b, 282b are overlapped in a radial direction of the rear bracket 12 to form a straight line when observed from the side. This is to cause cooling air to flow smoothly through and among the fin elements in a radial direction. Auxiliary terminal plate 286 is next superposed in such a manner as to insert a tongue 286c thereof in a space formed between the opposed leads 283a, 284a of the diodes 283, 284, and is secured to the rear bracket 12 by inserting a bolt (not shown) in the fixing hole 281d. Then, the tongue 286c and the leads 283a, 284a of the diodes are held together by a welding electrode from the radial direction and spot-welded.

The armature 5, circuit board 17, rectifier 28, already partially assembled as described above, are then completely assembled to the state shown in FIG. 8 in the following manner. First, the rectifier 28, voltage regulator 6, etc. are incorporated in the rear bracket 12. The position of the terminals 286a of the auxiliary terminal plate 286 of the rectifier 28 is adjusted to meet the position (as seen in FIG. 3) of the connection terminals 172b, 173b, 174b, 175g of the circuit board 17 mounted on the armature 5, and the terminals 286a are built therein. Then, the bolt 176 is caused to pass through each connection terminal of the circuit board 17 from inside armature 5 (in which the rotor 3 has not yet been inserted), and put in screw-engagement with a female screw disposed on each terminal 286a of the auxiliary terminal plate 286 and clamped in the axial direction of armature 5, thereby being electrically connected.

The remaining arrangement is the same as the foregoing embodiment shown in FIG. 4 and, therefore, a further description is omitted in view of the convention of designating the same reference numerals to the like parts.

In this embodiment, the armature 5 and circuit board 17 are the same as those shown in FIG. 1, but it is to be noted that they are combined with the improved rectifier 28. More specifically, in the rectifier 28, each fin element of the two heat radiating fins 281b, 282b are overlapped in the radial direction of the rear bracket 12 and form a straight line when observed from the side, as described above. Further, the flat mounting faces 281a, 282a of each cooling plate are positioned on the same plane, perpendicular to the shaft 31 of the rotor 3, and each diode 283, 284 is mounted on a respective one of the mounting faces 281a, 282a. As a result, cooling air flows smoothly in radial direction through and among the fin elements of the heat radiating fins 281b, 282b, and the cooling air flow is not inhibited by the diodes 283, 284; this results in an improvement in the entire cooling efficiency, and a reduction in the noise otherwise caused by the cooling fans.

Further, as a result of employing the circuit board 17 and auxiliary terminal plate 286, the length of the generator in the axial direction thereof is not elongated. Furthermore, although in the generator shown in FIG. 4 it is necessary to carry out the clamping after putting the diode terminals 183b, 184b between the circuit board 17 and auxiliary terminal plate 186, in the generator according to this embodiment, the connection between the auxiliary terminal plate 286 of the rectifier 28 and the circuit board 17 can be achieved just by clamping with the bolt 176 in the axial direction of the armature, resulting in easy connection work. Thus, the advantage achieved by the employment of the circuit board is all the more significant.

Figure 14:
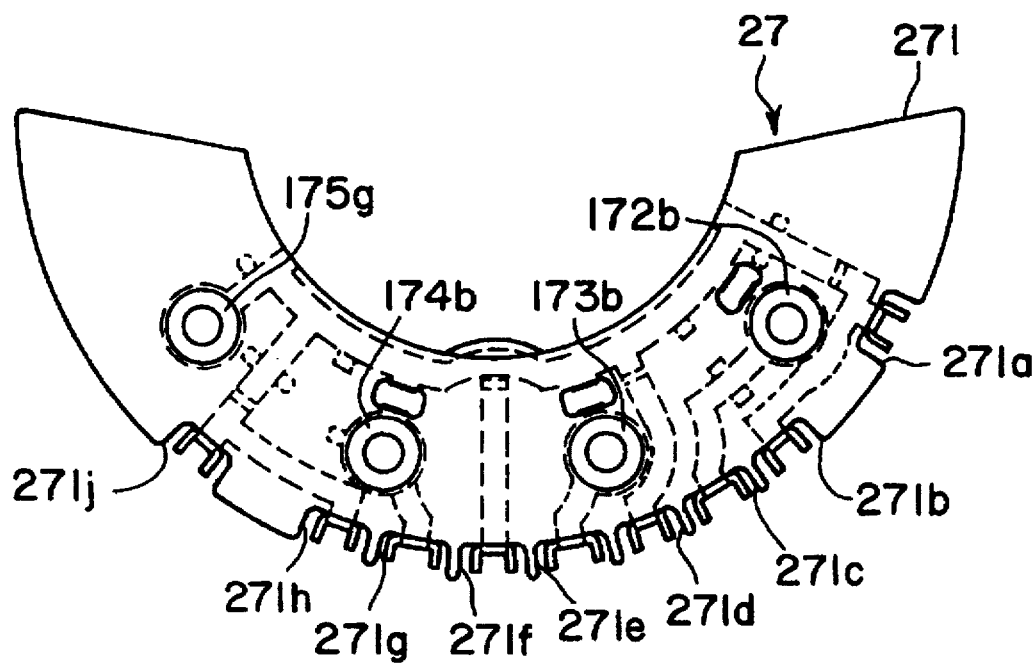
FIG. 14 is a front view of a further embodiment of the invention showing the circuit board looking from the armature side.
Figure 15:
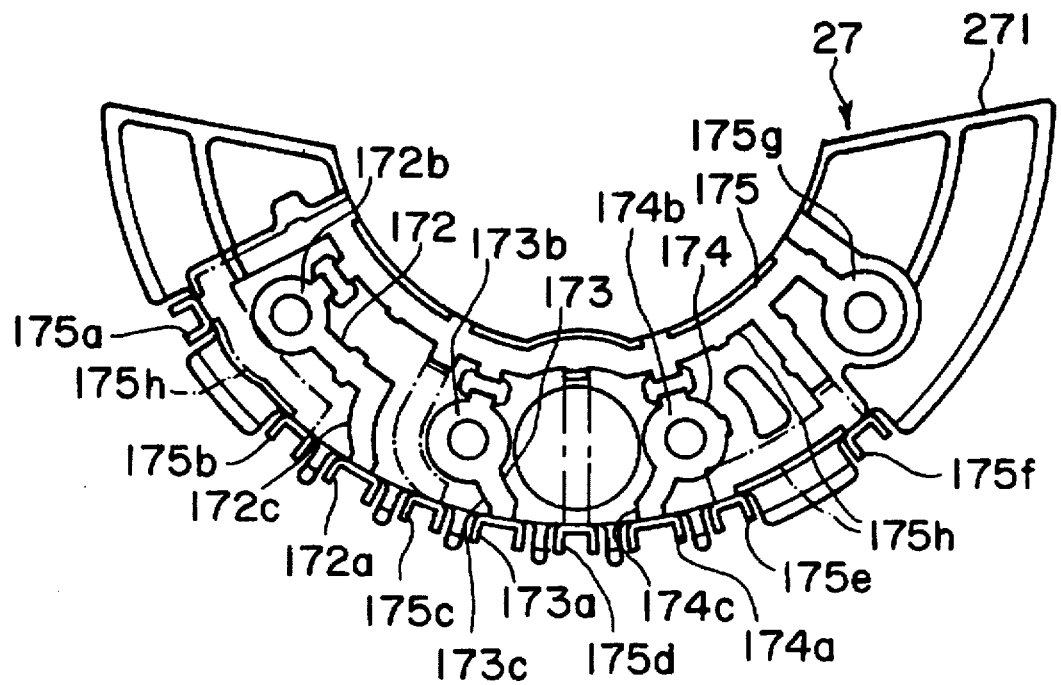
FIG. 15 is a rear view of the circuit board looking from the opposite side of the armature of FIG. 14.

FIGS. 14 and 15 show a further embodiment of the vehicle mounted alternator or generator of the present invention. FIG. 14 is a front view of the circuit board seen from the armature side, and FIG. 15 is a rear view thereof, looking from the opposite side of the armature. The circuit board 27 has a substrate 271 serving as a supporting member, and the configuration of the substrate 271 is different from the substrate 171 shown in FIG. 1. The substrate 271, being made of an insulating material for molding, is formed integrally with the insert terminals 172 to 175 by insertion molding. The substrate 271 is almost a circular arc and plate-shaped, and reinforcing ribs are appropriately disposed on the peripheral edge portions, middle part, etc. of the circular arc on the back side thereof (opposite side of the armature) (as seen in FIG. 15). In addition, insert terminals 172 to 175 are exposed on the back side of the substrate 271.

Cutout parts 271a to 271j (shown in FIG. 14) of almost square shape are provided on the outer periphery of the substrate corresponding to the lead wire connection parts 172a, 173a, 174a, 175a to 175f of the insert terminals. By providing these cutout parts with the lead wire connection parts, it is now possible to mount the circuit board 27 on the armature 5 from a radial direction without passing the lead wires through the circuit board 27. Accordingly, since there is no need for passing the lead wires of the three-phase windings 53, 54 of the armature through the substrate 271, assembly can be efficiently performed.

The remaining arrangement is the same as that shown in FIG. 8.

Figure 16:
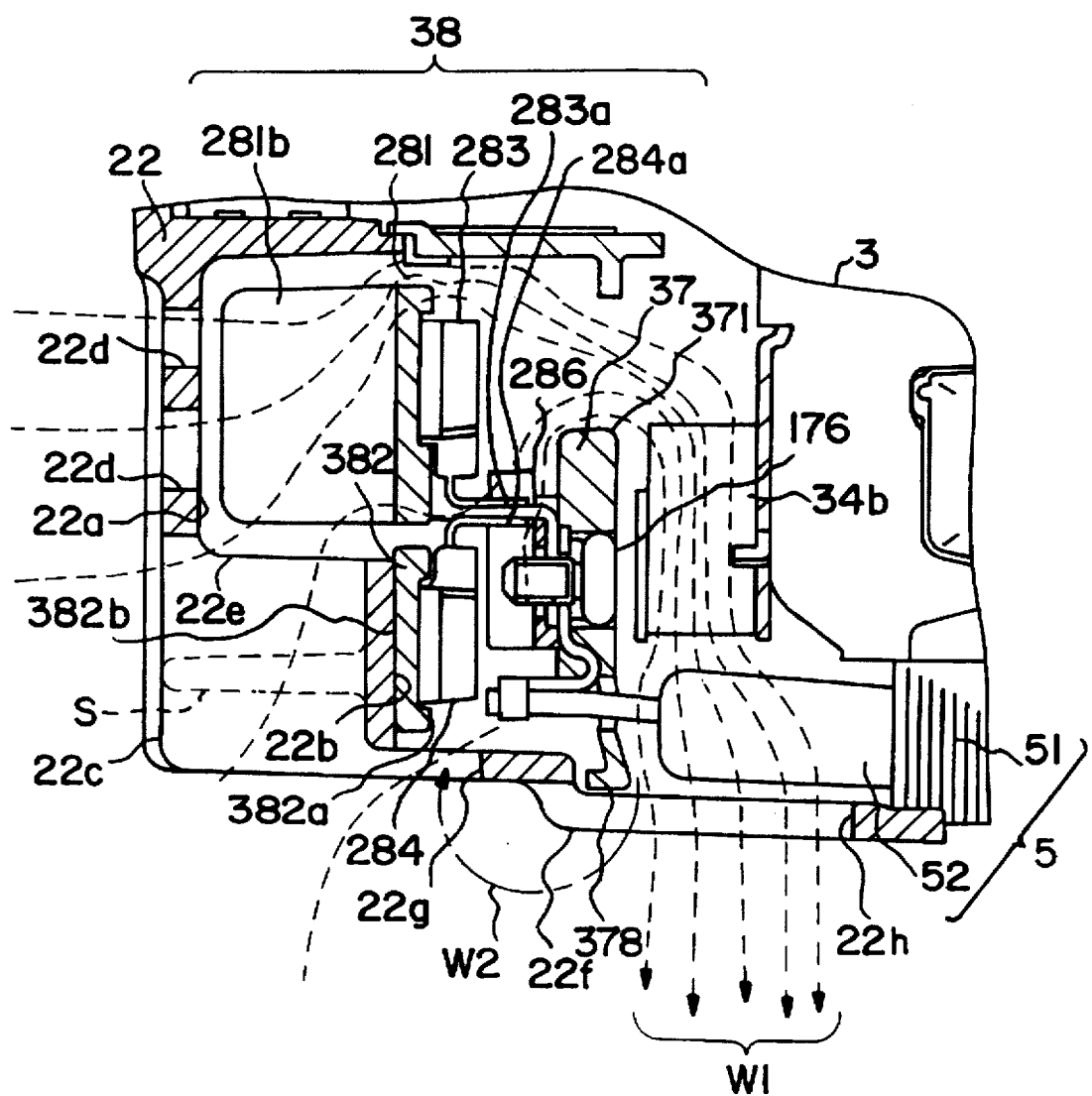
FIG. 16 is a partially sectional view showing the essential part of the generator according to a further example of the invention.
Figure 17:
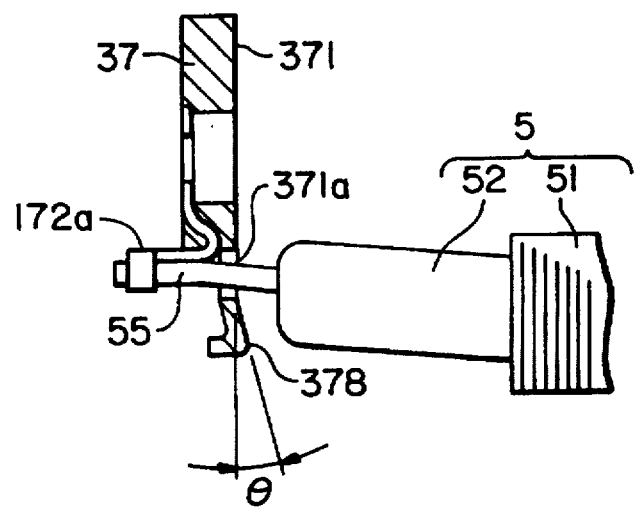
FIG. 17 is a sectional view showing a section of the circuit board portion of the embodiment of FIG. 16.

FIGS. 16 and 17 show still another embodiment of the vehicle-mounted alternate or generator according to the present invention, in which the arrangement of the rectifier and circuit board is different from the foregoing embodiments. FIG. 16 is a partially sectional view showing an essential part of the generator, and FIG. 17 is a sectional view showing a section of the circuit board. In the drawings, the circuit board 37 has a substrate 371 serving as a supporting member, and the shape of this substrate 371 is different from the substrate 171 shown in FIG. 1.

The substrate 371 of the circuit board 37 has an inclined part 378 inclining with a predetermined angle θ (e.g., an angle of 30 degrees) around the exhaust part of cooling air (i.e., downwardly toward armature 5 in FIG. 17). As shown in FIG. 16, the inclined part 378 extends so as to be adjacent the inner periphery of the rear bracket 22 and is formed into a circular arc shape, whereby leakage of cooling air out of the space between the two parts is minimized. The remaining arrangement of the circuit board is the same as the circuit board 17 shown in FIGS. 2 and 3.

Reference numeral 22 of FIG. 16 denotes a rear bracket 22 with a middle part provided with a recess 22a (on the left-hand side in the drawing). On the outer periphery of the recess 22a i.e., on the left side of the direct mounting part 22b on which a cooling plate 382 (described later) on the negative electrode side is directly mounted, a plurality of heat radiating fins 22c are radially and integrally formed at the same pitch angle as that of the heat radiating fins 281b of the cooling plate 281 on positive electrode side. In addition, a section of the fins 22c is conical as shown by the dotted line S, according to the contour of the fins 22c in the lower left part of FIG. 16. The rear bracket 22 is made of aluminum alloy by die casting.

On the left side portion of the recess 22a in FIG. 16, six pairs of slot-shaped ventilating holes 22d, i.e., twelve ventilating holes in total are formed looking from the left side of FIG. 16, with a certain distance between the paired ventilating holes in a radial direction and passing axially through the recess 22a. Ventilating holes 22e passing through the rear bracket 22 are formed radially from the rotary shaft 3, corresponding to the positions of ventilating holes 22d. Further, a ventilating hole 22g is formed on the extreme outer periphery 22f of the rear bracket 22, facing the lead wires of the three-phase windings 53, 54, of the diode 284 and the armature 5, and a ventilating hole 22h is formed on the part corresponding to the coil end 52a.

Arrangement of the rectifier 38 is hereinafter described. The cooling plate 281 on positive electrode side is the same as that shown in FIGS. 8 and 9. The cooling plate 382 on negative electrode side is formed into an almost circular, arc-shaped strap having a curvature radius larger than that of cooling plate 281, and one side of which is used as a flat mounting face 382a while the other side is used as a flat direct mounting part 382b. The cooling plate 382 on negative electrode side is made of aluminum alloy by die casting. The remaining arrangement is the same as the radiating fins 281 shown in FIG. 10, and the four diodes 284 are soldered to the mounting surface 382a.

Disposed on the outside of the cooling plate 281 on the positive electrode side within a certain distance in a radial direction, are the cooling plate 382 on the negative electrode side so as to superpose radially on the cooling plate 281, and the mounting surfaces 281a, 382a so as to be positioned in the same plane perpendicular to the rotary shaft 3. The cooling plate 281 on the positive electrode side is accommodated in the recess 22a of the rear bracket 22, and the cooling plate 382 on negative the electrode side is filled with a silicon bound of high thermal conductivity, and directly mounted thereon, securing a sufficient contact area so that the direct mounting part 382b may transfer a heat satisfactorily to the direct mounting part 22b of the rear bracket 22. Further, the heat radiating fins 281b and the fins 22c respectively formed radially are arranged such that the fin elements thereof are superposed in a radial direction.

The remaining arrangement is the same as that shown in FIG. 8.

In the generator of this construction, since the inclined part 378 is provided on the radially outside part of the substrate 371 of the circuit board 37 so as to be adjacent to the rear bracket 22, the cooling air inhaled through the ventilating holes 22d, 22e, 22g of the rear bracket by the cooling fan 34b can cool the heat radiating fins 22c, 281b effectively. The cooling air goes through and around the diodes 284, 283 and, after flowing through the central part, is discharged through the exhaust hole 22h. In other words, as a result of providing the inclined part 378 of the circuit board 37, a circulating air flow going out through the exhaust hole 22h and coming in again through the ventilating hole 22g as shown by the arrow W2 of one-dot-chain line in the drawing is prevented; instead, an effective cooling air flow W1 is thus achieved.

Figure 18:
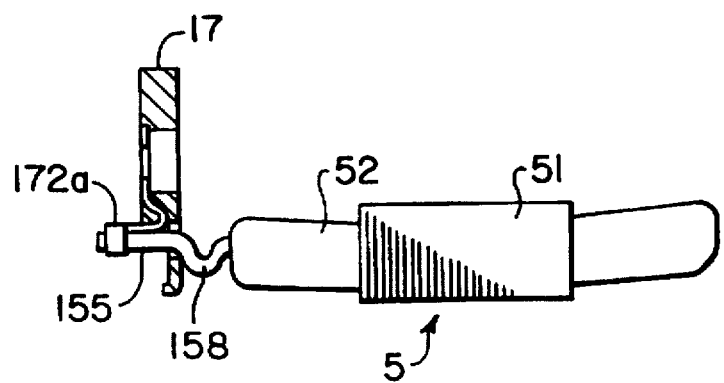
FIG. 18 is a partially sectional view showing the essential part of the generator according to a further example of the invention.
Figure 19A:
FIG. 19 is a schematic view showing the configuration of the bends of the lead wires according to a further example of the invention.
Figure 19B:
Figure 19C:
Figure 19D:
Figure 19E:

FIG. 18 shows yet another embodiment of the vehicle-mounted alternator or generator of the present invention, and is a partially sectional view showing an essential part of the generator. Reference numeral 158 denotes a bend which is a partially bent part formed by bending a part of a lead wire into a semicircular shape. In every lead wire of each phase coil of the armature winding 52, each bend 158 is formed between the armature 5 and the lead wire connection part of the circuit board 17. FIG. 18 shows a bend 158 in the three-phase connection lead wire 55 (53as, 54ae) connected to the lead wire connection part 172a.

In addition, bends 158a to 158e of various other shapes as shown in schematic views of FIGS. 19(a) to (e) or a bend of any other shape is also available without departing from the objects of the invention.

As a result of providing the bend 158 on the lead wires of each phase coil of the armature 5 as described above, the bend 158 absorbs dimensional errors of the lead wires, thereby preventing application of a large stress to the windings at the time of assembling. Stress due to vibration, thermal expansion, etc. is reduced. Accordingly, reliability of the arrangement is improved.

It is to be noted that the lead wires of the stator winding, led almost in parallel to the axial direction of the armature core 51 serving as a stator core in the invention, include those lead wires provided with a slightly bent part like the bend described above, and it is preferable that the lead wires are provided with such a slightly bent part without departing from the objects of the invention.

Although the connection between the lead wires (53as, 54ae, for example) and the lead wire connection parts (172a, for example) is made by welding after clamping in each of the foregoing embodiments, it is also preferable that the connection be made by any other metallurgical joining, press-fitting or soldering such as fusing or brazing.

Each of the foregoing embodiments corresponds to the circuit shown in FIG. 21, and in which the diodes 283, 284 are disposed also on the neutral point side. In the generator of which circuit is shown in FIG. 27, however, since there is no need of output from the neutral points, bolt 176 of the connection terminal 175g, serving as an outputting connection part on neutral point side, and a diode corresponding thereto can be omitted.

Further, although the inclination of the inclined part is 30 degrees in the embodiment shown in FIG. 17, it is also preferable that the inclination is set to any other angle corresponding to the shape of the bracket or coil end, e.g., in the range of 10 to 30 degrees.

It is also preferable that the foregoing embodiments be appropriately combined with each other as a matter of course.

The generator is not limited to one having the three-phase star connection, but a generator having a delta connection or one of single-phase is also suggested. The same advantage is exhibited in case of an induction generator. It is also preferable that the winding is arranged by connecting not less than three coils in parallel.

While the present invention has been described in a specific embodiment thereof, it is evident that many alternatives, modifications and variations will be apparent to those skilled in the art. Hence, it is understood that the present invention may be practiced otherwise than as specifically described and still be within the scope of the appended claims.

What is claimed is:

1. A vehicle-mounted alternator comprising:
   a stator,
   a rotor,
   a junction connection device, and
   a rectifier;
   wherein said stator comprises:
      a stator core, having an inner peripheral wall which forms a cylindrical hollow part, and
      a stator winding having lead wires;
   wherein said stator winding is wound around said stator core, said lead wires are led out from said stator core in an axial direction of said stator core, and said lead wires are substantially in parallel;
   wherein said junction connection device comprises:
      a supporting member of insulating material, junction conductive members fixedly supported on said supporting member, outputting connection parts, lead wire connection parts, and connecting conductor parts for connecting said lead wire connection parts to said outputting connection parts;

wherein said rotor is rotatably supported in said cylindrical hollow part by a bracket;

wherein said junction connection device is disposed in an axial direction of said stator;

wherein said lead wires are connected to said lead wire connection parts to form said stator winding into a predetermined connection state so that an AC output is outputted from said outputting connection parts;

wherein an AC side of said rectifier is connected to said outputting connection parts, and said AC output of said winding is rectified to a DC output by said rectifier, and wherein said rectifier further includes a positive electrode side cooling plate and a negative electrode side cooling plate, each of said cooling plates being disposed in an axial direction of said stator, and each having respective heat radiating fins extending therefrom in a direction opposite said stator.

2. The vehicle-mounted alternator as set forth in claim 1, wherein:

said stator has three-phase windings;

a first subset of said junction conductive members are on a neutral point side of said three-phase windings;

said outputting connection parts lead a neutral point of said stator winding to outside via said first subset junction conductive members;

a second subset of said junction conductive members are on a phase voltage side of said three-phase windings;

said outputting connection parts lead a phase voltage to outside via said second subset of said junction conductive members;

each of said lead wires on said neutral point side is connected to respective ones of said lead wire connection parts of said junction conductive members on said neutral point side, thereby defining neutral point connections;

each of said lead wires on said phase voltage side is connected to respective ones of said lead wire connection parts of said junction conductive members on said phase voltage side, thereby defining phase voltage connections;

said neutral point connections and said phase voltage connections cause said three-phase windings to have a star connection;

said AC output is a three-phase AC voltage, and is outputted from the outputting connection parts of said junction conductive members on said phase voltage side; and an AC side of said rectifier is connected to said outputting connection parts of said junction conductive members on said phase voltage side.

3. The vehicle-mounted alternator as set forth in claim 2, wherein:

each of said three-phase windings has a plurality of coils;

each of said plurality of coils are connected in parallel by way of (1) said junction conductive members on said neutral point side and (2) said junction conductive members on said phase voltage side.

4. The vehicle-mounted alternator as set forth in claim 1, wherein:

each of said connecting conductor parts of said junction conductive members are formed into a plate-shape;

said supporting member is formed into a circular arc-shaped plate integrally with said connecting conductor parts.

5. The vehicle-mounted alternator as set forth in claim 1, wherein:

at least one of said connecting conductor parts is exposed out of said supporting member.

6. The vehicle-mounted alternator as set forth in claim 1, wherein:

said lead wires are connected by metallurgical joining to said lead wire connection parts, said metallurgical joining being at least one of clamping, welding, press-fitting, soldering, fusing, and brazing.

7. The vehicle-mounted alternator as set forth in claim 6, wherein:

said metallurgical joining takes place on a side of said supporting member opposite said stator.

8. The vehicle-mounted alternator as set forth in claim 7, wherein:

said rectifier has plate-shaped AC side terminals;

said connecting conductor parts and said outputting connection parts are integrally formed of a plate-shaped conductor; and said AC side terminals are clamped by clamping members to said outputting connection parts in said axial direction of said stator.

9. The vehicle-mounted alternator as set forth in claim 1, wherein:

said supporting member has an outer periphery and output parts thereon;

each of said lead wire connection parts is disposed in said cutout parts; and said lead wires are inserted radially into said cutout parts.

10. The vehicle-mounted alternator as set forth in claim 1, wherein:

said rotor has a cooling fan for inhaling outside air through said bracket;

said junction connection device is disposed in said bracket; and said supporting member, and blades of said cooling fan, are perpendicular to said axial direction.

11. A vehicle-mounted alternator comprising:

a stator, a rotor, a junction connection device, and a rectifier;

wherein said stator comprises:

a stator core, having an inner peripheral wall which forms a cylindrical hollow part, and a stator winding having lead wires;

wherein said stator winding is wound around said stator core, said lead wires are led out from said stator core in an axial direction of said stator core, and said lead wires are substantially in parallel;

wherein said junction connection device comprises:

a supporting member of insulating material, junction conductive members fixedly supported on said supporting member, outputting connection parts, lead wire connection parts, and connecting conductor parts for connecting said lead wire connection parts to said outputting connection parts;

wherein said rotor is rotatably supported in said cylindrical hollow part by a bracket, and has a cooling fan for inhaling outside air though said bracket;

wherein said junction connection device is disposed in an axial direction of said stator, in said bracket;

wherein said supporting member, and blades of said cooling fan, are perpendicular to said axial direction;

wherein said lead wires are connected to said lead wire connection parts to form said stator winding into a predetermined connection state so that an AC output is outputted from said outputting connection parts;

wherein an AC ride of said rectifier is connected to raid outputting connection parts, and said AC output of said winding is rectified to a DC output by said rectifier; and wherein said supporting member has an inclined part inclining to an outer periphery thereof.

12. The vehicle-mounted alternator as set forth in claim 1, wherein:

said lead wires have partially bent parts and are connected to said lead wire connection parts by way of said partially bent parts.

13. A vehicle-mounted alternator comprising:

a stator having a cylindrical hollow part and comprising a stator winding, said stator winding having lead wires extending (1) axially from said stator and (2) substantially in parallel, said lead wires being at least one of neutral point lead wires and phase voltage lead wires;

a rotor disposed in said cylindrical hollow part of said stator;

a junction connection device connected to said lead wires at an axial end of said stator; and a rectifier connected to said junction connection device, diodes of said rectifier having respective electrodes which are insertably disposed between terminals of said junction connection device and terminals of an auxiliary terminal plate, wherein said junction connection device, without modification thereof and without modification of said stator winding, accommodates a predetermined connection state for three-phase windings providing a neutral output, and also for three-phase windings free of a neutral output.

14. The vehicle-mounted alternator as set forth in claim 1, wherein each of said heat radiating fins of said positive electrode side cooling plate has a respective pitch angle identical to a respective pitch angle of a corresponding one of said heat radiating fins of said negative electrode side cooling plate.

15. The vehicle-mounted alternator as set forth in claim 13, wherein:

said rectifier further includes a positive electrode side cooling plate and a negative electrode side cooling plate, each of said cooling plates being disposed in an axial direction of said stator, and each having respective heat radiating fins extending therefrom in a direction opposite said stator; and each of said heat radiating fins of said positive electrode side cooling plate has a respective pitch angle identical to a respective pitch angle of a corresponding one of said heat radiating fins of said negative electrode side cooling plate.

* * * * *